(12) United States Patent
Taoka et al.

(10) Patent No.: US 8,654,747 B2
(45) Date of Patent: Feb. 18, 2014

(54) BASE STATION, USER EQUIPMENT TERMINAL AND METHOD

(75) Inventors: Hidekazu Taoka, Nerima-ku (JP);
Yoshihisa Kishiyama, Yokosuka (JP);
Nobuhiko Miki, Yokohama (JP);
Kenichi Higuchi, Saitama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 288 days.

(21) Appl. No.: 12/991,448

(22) PCT Filed: May 12, 2009

(86) PCT No.: PCT/JP2009/058837
§ 371 (c)(1),
(2), (4) Date: Dec. 30, 2010

(87) PCT Pub. No.: WO2009/139383
PCT Pub. Date: Nov. 19, 2009

(65) Prior Publication Data
US 2011/0085536 A1    Apr. 14, 2011

(30) Foreign Application Priority Data

May 13, 2008 (JP) ................................ 2008-126428
Sep. 19, 2008 (JP) ................................ 2008-241677

(51) Int. Cl.
*H04W 4/00* (2009.01)
(52) U.S. Cl.
USPC ........... 370/338; 370/328; 370/329; 370/334; 370/348
(58) Field of Classification Search
USPC ......... 370/329, 328, 334, 337, 344, 336, 341, 370/348, 314, 350, 208, 209, 210; 455/452.2, 464; 375/260
See application file for complete search history.

(56) References Cited

U.S. PATENT DOCUMENTS 7,995,664 B2 * 8/2011 Ihm et al. ................. 375/260
8,254,329 B2 * 8/2012 Ko et al. ................... 370/330
(Continued)

FOREIGN PATENT DOCUMENTS

EP    2 180 603 A1    4/2010
WO    2009/025081 A1   2/2009

OTHER PUBLICATIONS

International Search Report w/translation from PCT/JP2009/058837 dated Jul. 28, 2009 (5 pages).

(Continued)

*Primary Examiner* — Ian N Moore
*Assistant Examiner* — Phong La
(74) *Attorney, Agent, or Firm* — Osha • Liang LLP

(57) ABSTRACT

A base station for communicating with a first user equipment terminal within a first system band and communicating with a second user equipment terminal within a second system band includes a first reference signal sequence generating unit configured to generate M types of reference signal sequences; a second reference signal sequence generating unit configured to generate N (N>M) types of reference signal sequences; a scheduling unit configured to allocate resource blocks to the first user equipment terminal and the second user equipment terminal; a signal multiplexing unit configured to multiplex the M types of reference signal sequences into the resource block for the first user equipment terminal and multiplex the N types of reference signal sequences into the resource block for the second user equipment terminal; and a transmitting unit configured to transmit signals including the M types of reference signal sequences and the N types of reference signal sequences.

11 Claims, 20 Drawing Sheets

(56) References Cited

U.S. PATENT DOCUMENTS

| | | | | |
|---|---|---|---|---|
| 2007/0248113 | A1* | 10/2007 | Ko et al. | 370/436 |
| 2008/0051125 | A1* | 2/2008 | Muharemovic et al. | 455/519 |
| 2008/0080560 | A1* | 4/2008 | Inoue et al. | 370/491 |
| 2008/0253484 | A1* | 10/2008 | Kakura et al. | 375/343 |
| 2008/0318608 | A1* | 12/2008 | Inoue et al. | 455/509 |
| 2009/0220021 | A1* | 9/2009 | Ihm et al. | 375/267 |
| 2010/0014481 | A1* | 1/2010 | Ko et al. | 370/330 |
| 2010/0086082 | A1* | 4/2010 | Ogawa et al. | 375/308 |
| 2010/0103890 | A1* | 4/2010 | Ishii et al. | 370/329 |
| 2010/0220808 | A1* | 9/2010 | Kishigami et al. | 375/295 |
| 2010/0284265 | A1* | 11/2010 | Ogawa et al. | 370/208 |
| 2010/0296459 | A1* | 11/2010 | Miki et al. | 370/329 |
| 2010/0316156 | A1* | 12/2010 | Higuchi et al. | 375/267 |
| 2011/0085536 | A1* | 4/2011 | Taoka et al. | 370/338 |
| 2011/0211538 | A1* | 9/2011 | Kakura | 370/329 |
| 2011/0228877 | A1* | 9/2011 | Han et al. | 375/295 |

OTHER PUBLICATIONS

Written Opinion from PCT/JP2009/058837 dated Jul. 28, 2009 (4 days).

3GPP TSG RAN WG1 Meeting #53, R1-081948; "Proposals for LTE-Advanced Technologies"; NTT DOCOMO, Inc.; Kansas City, USA; May 5-9, 2008 (15 pages).

3GPP TSG RAN WG #53, R1-082270; "CR on Downlink RS" Sansung; Kansas City, USA; May 5-9, 2008 (9 pages).

3GPP TSG RAN WG1 Meeting #53, R1-081809; "On the Consideration of Technical Candidates for LTE-Advanced"; LG Electronics, Inc.; Kansas City, MO, USA; May 5-9, 2008 (7 pages).

3GPP TSG RAN1 53 Meeting; R1-081773; "Technical Points for LTE-Advanced"; Kansas, USA; May 5-9, 2008 (5 pages).

3GPP TSG RAN WG1 Meeting #55bis, R1-090317; "Support of DL Higher-Order MIMO Transmission in LTE- Advanced"; NTT DOCOMO, Inc.; Ljubljana, Slovenia; Jan. 12-16, 2009 (9 pages).

3GPP TSG-RAN1 #56, R1-090706; "DL Reference Signal Design for 8×8 MIMO in LTE-Advanced"; Fujitsu; Athens, Greece; Feb. 9-13, 2009 (12 pages).

3GPP TS RAN WG1 Meeting #55bis, R1-090023; "Backward Compatible Design of Downlink Reference Signals in LTE-Advanced"; Sharp; Ljubljana, Slovenia; Jan. 12-16, 2009 (6 pages).

3GPP TSG RAN WG1 Meeting #57, R1-091984; "Demodulation RS Design for LTE-A"; CATT; San Francisco, USA; May 4-8, 2009 (9 pages).

3GPP TSG-RAN Working Group 1 Meeting #54bis, R1-083869; "Design Consideration for Higher-Order MIMO in LTE-Advanced" Nortel; Prague, Czech Rep; Sep. 29-Oct. 3, 2008 (8 pages).

TSG-RAN1 #54, R1-083157; "RS Design Considerations for High-Order MIMO in LTE-A"; Nortel Networks; Jeju, Korea; Aug. 18-22, 2008 (3 pages).

3GPP TSG Ran1 #54, R1-083224; "Common Reference Symbol Mapping/Signaling for 8 Transmit Antennas"; Motorola; Jeju, Korea' Aug. 18-22, 2008 (5 pages).

3GPP TS 36.211 V8.1.0; "3rd Generation Partnership Project; Technical Specification Group Radio Access Network; Evolved Universal Terrestrial Radio Access (E-UTRA); Physical Channels and Modulation (Release 8)"; Nov. 2007 (54 pages).

* cited by examiner

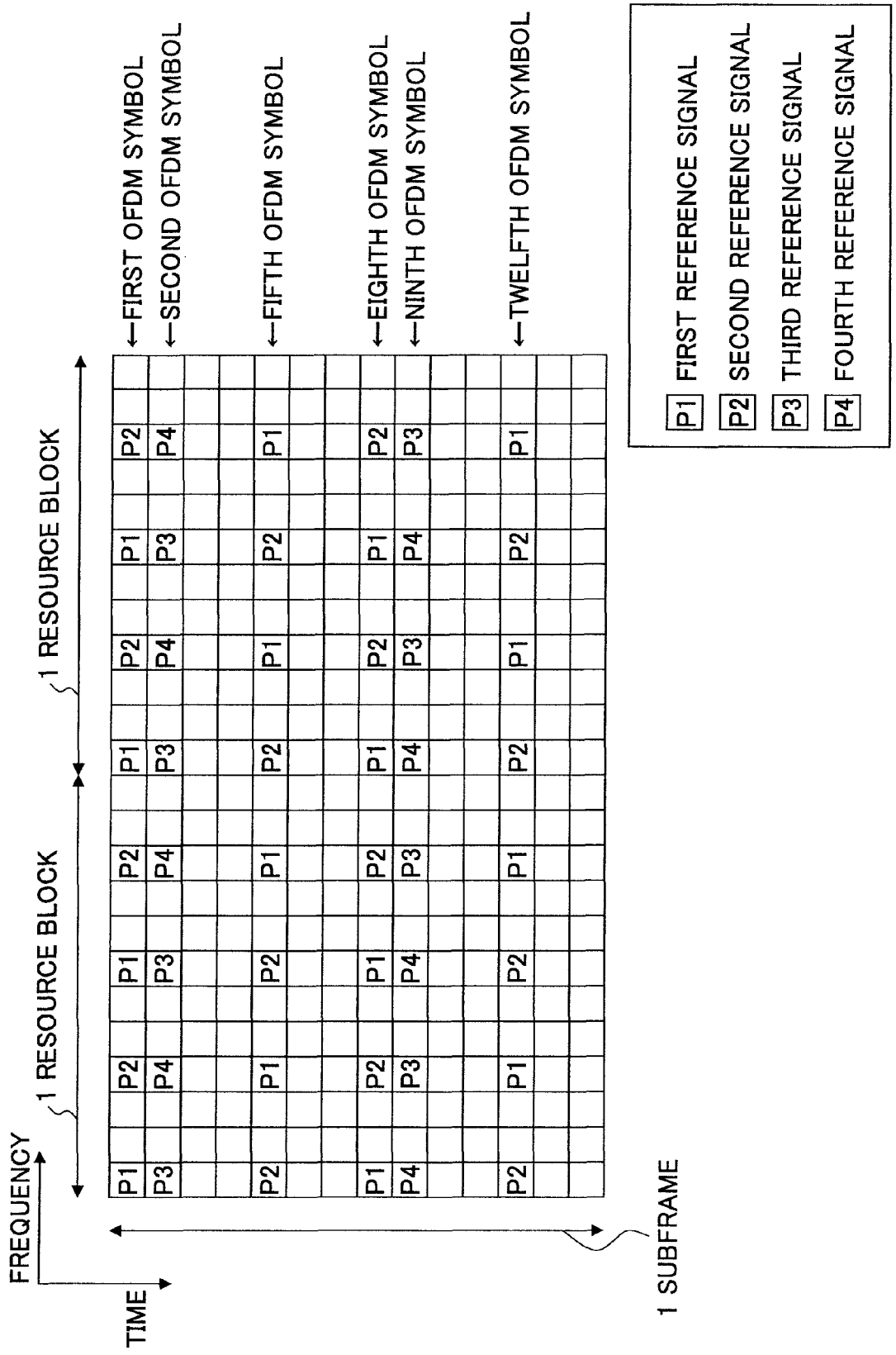

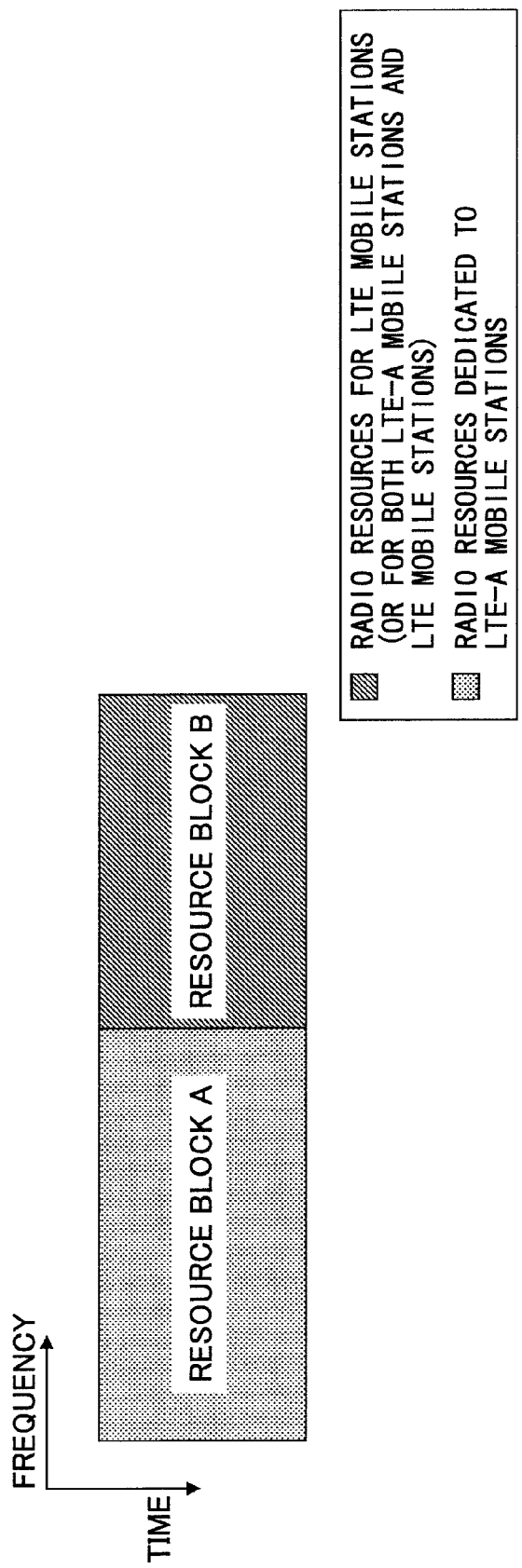

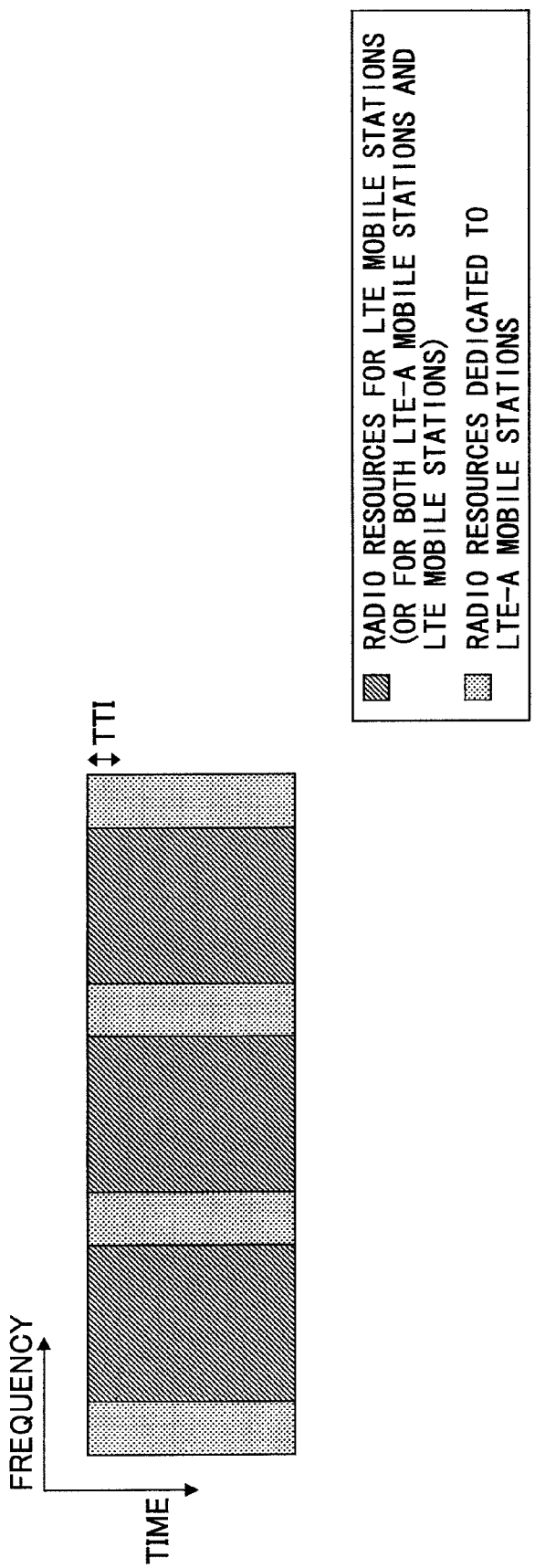

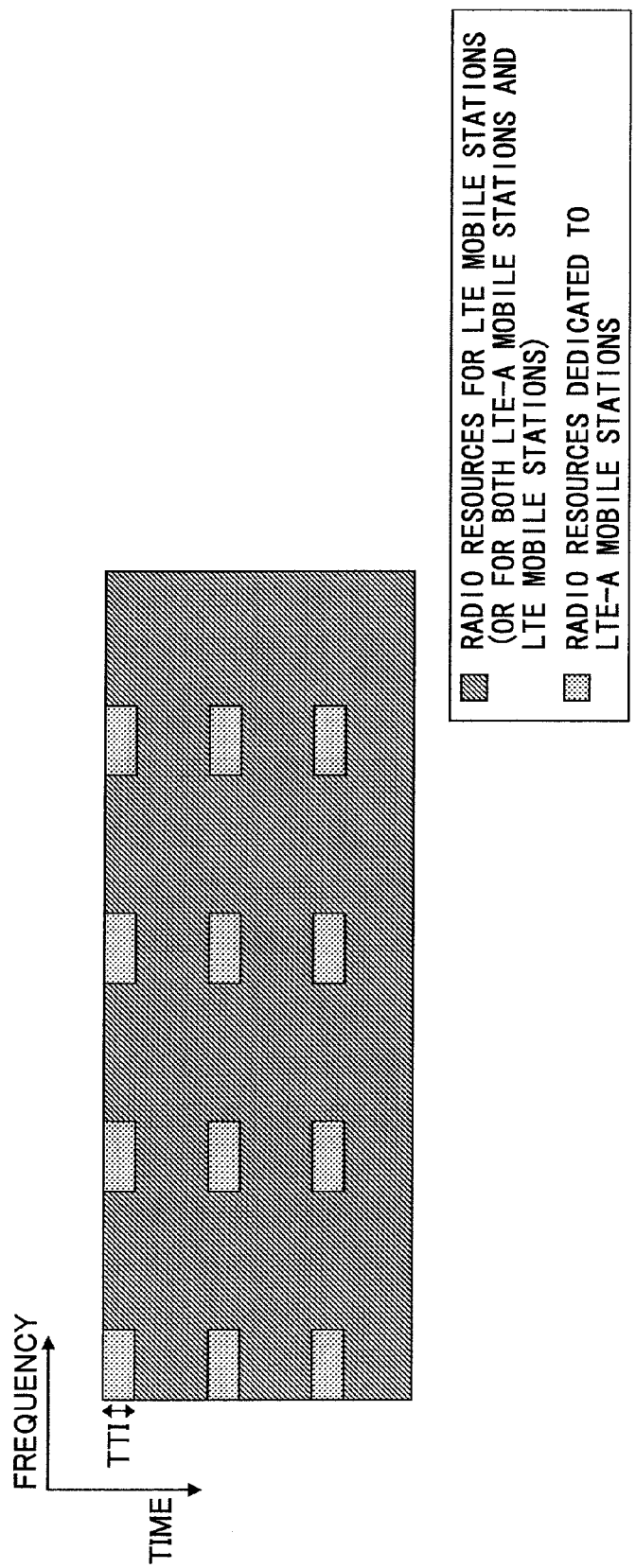

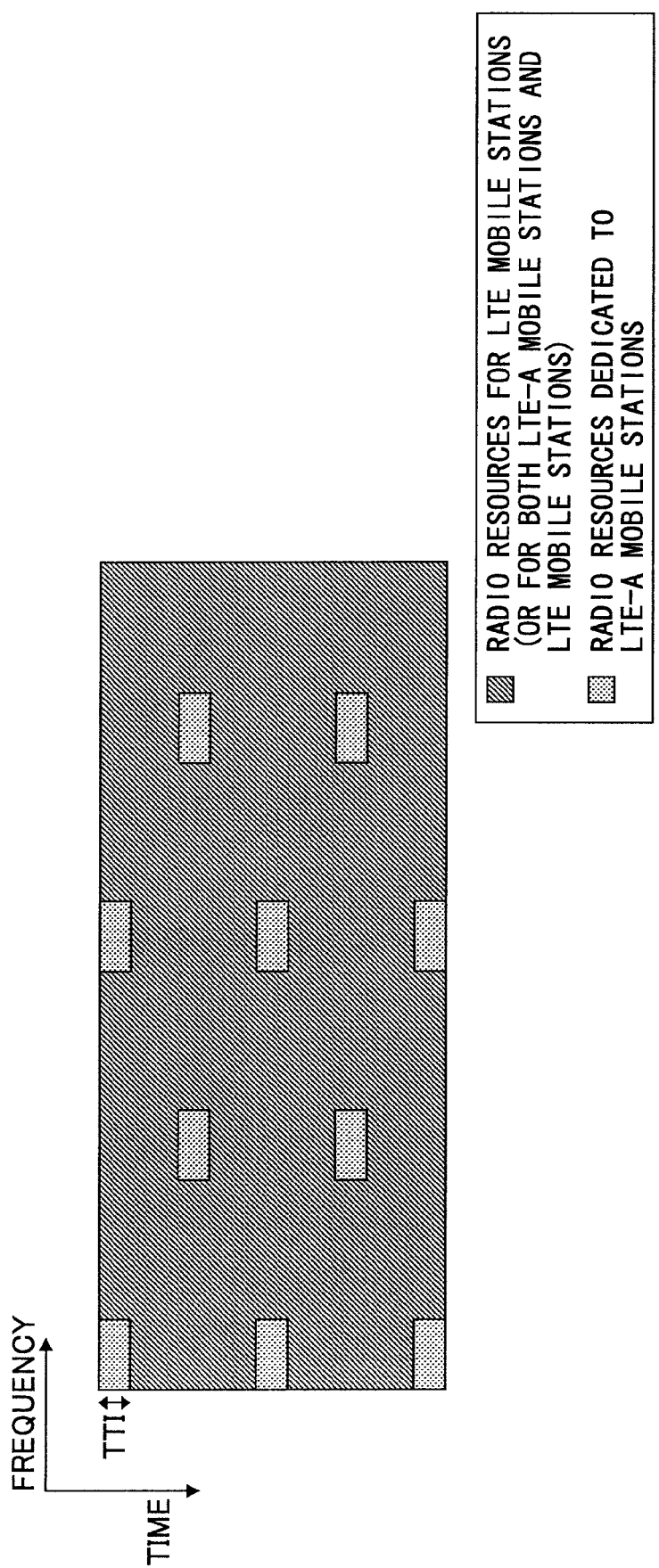

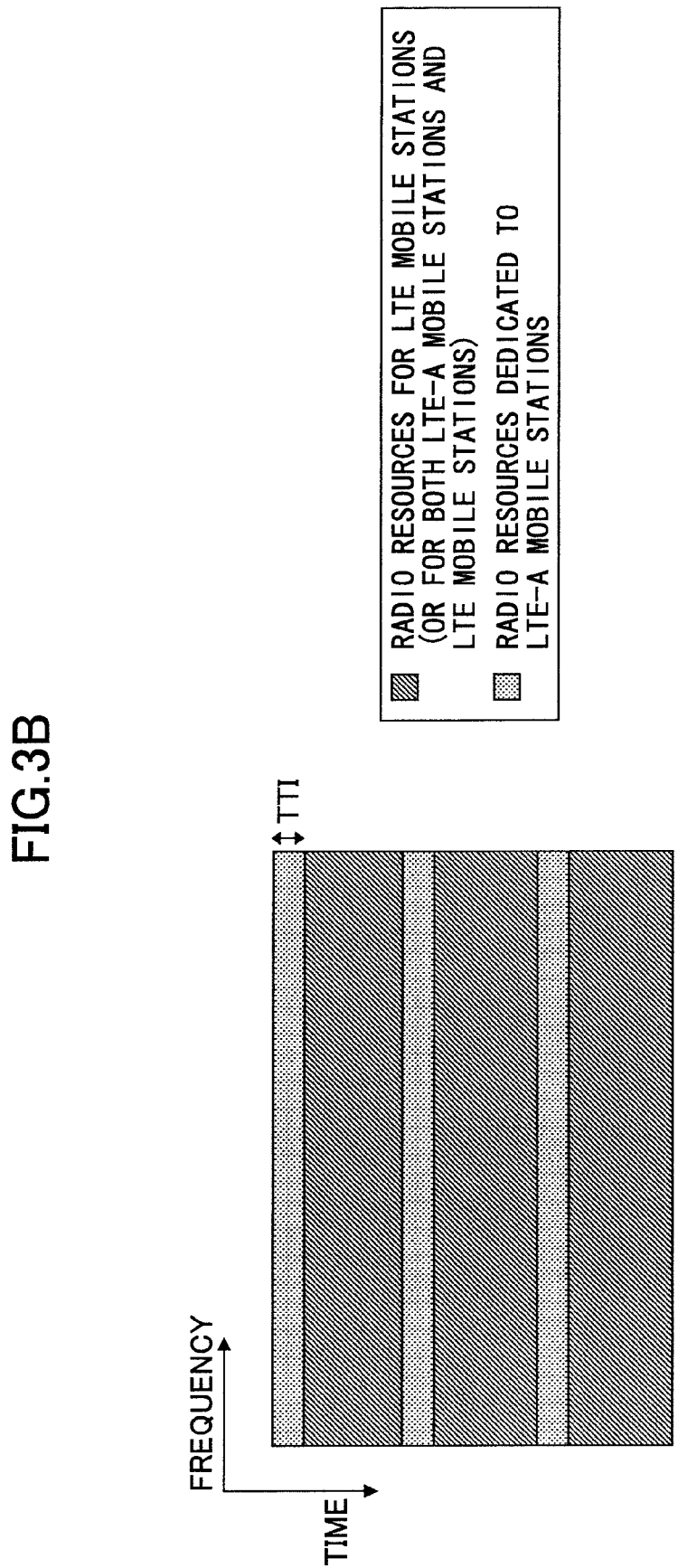

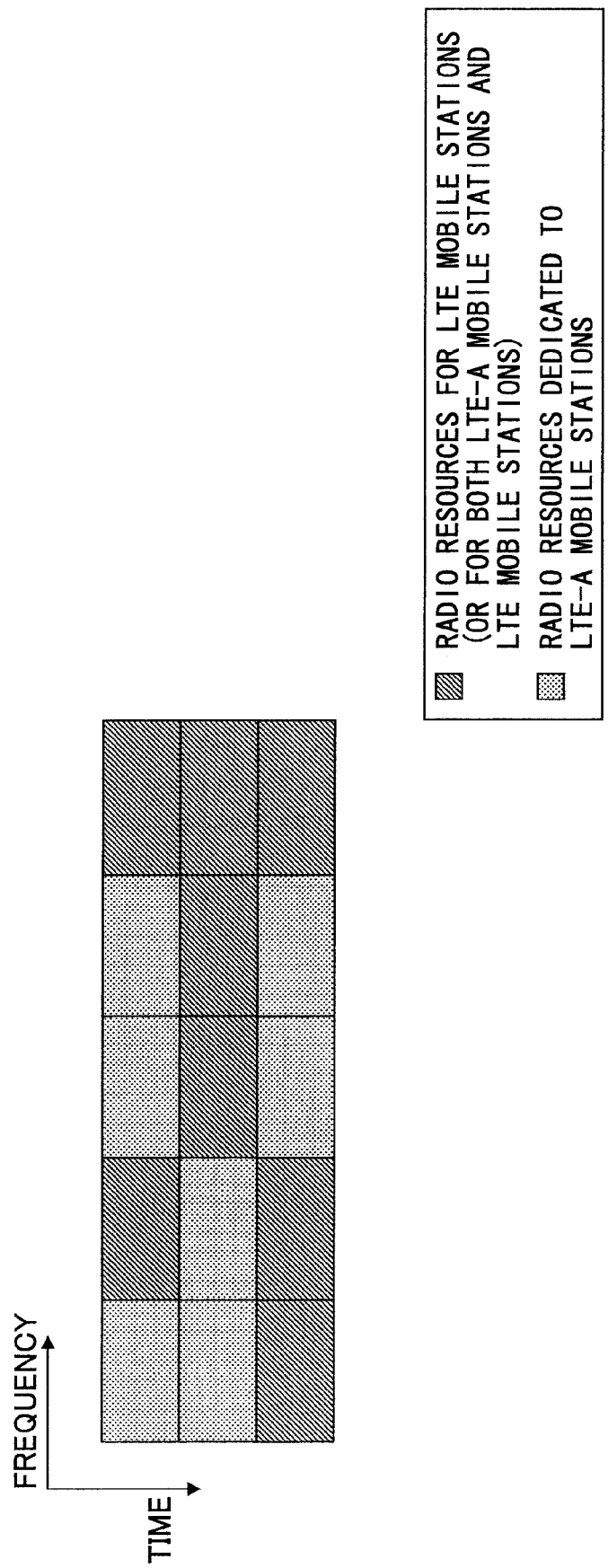

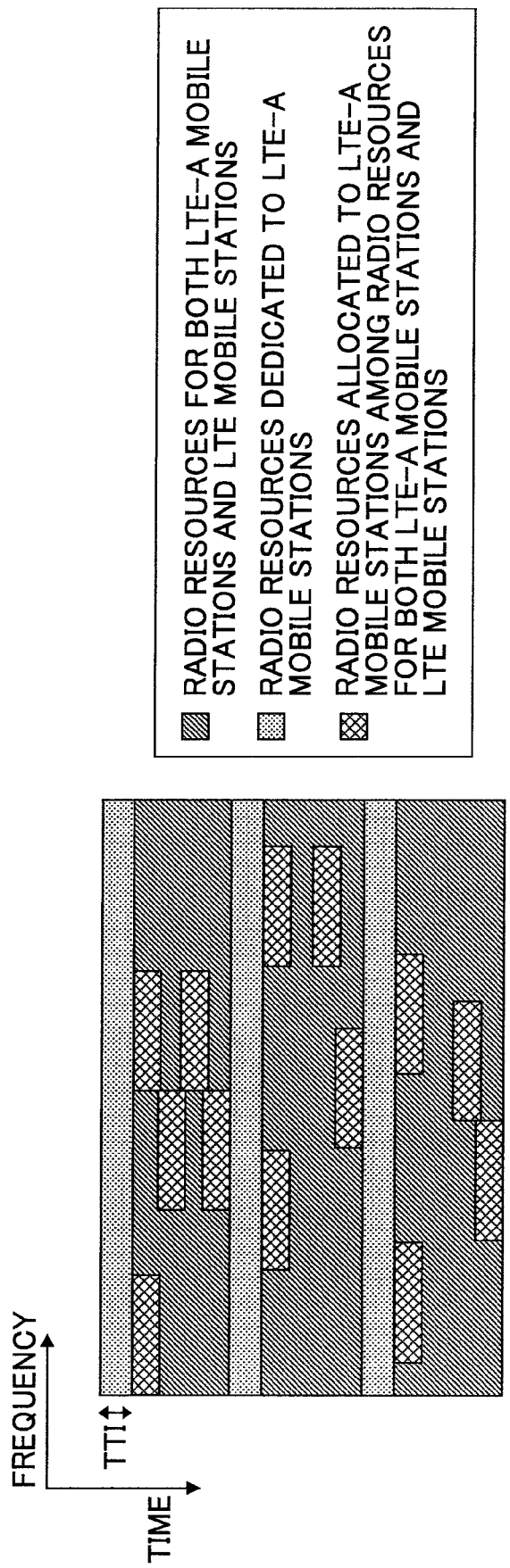

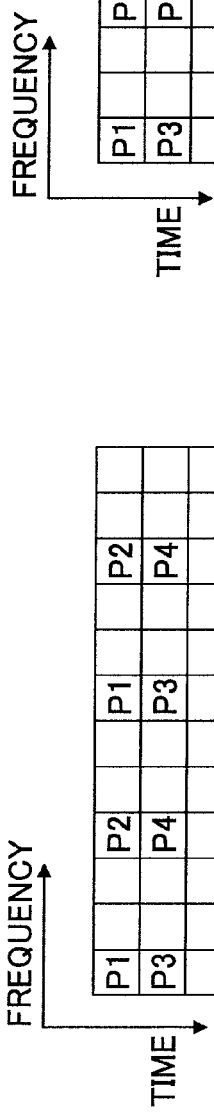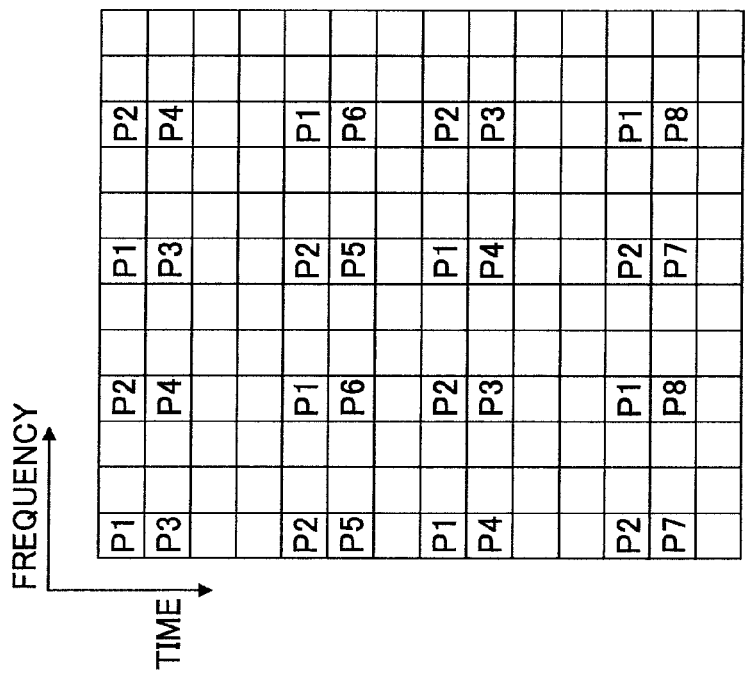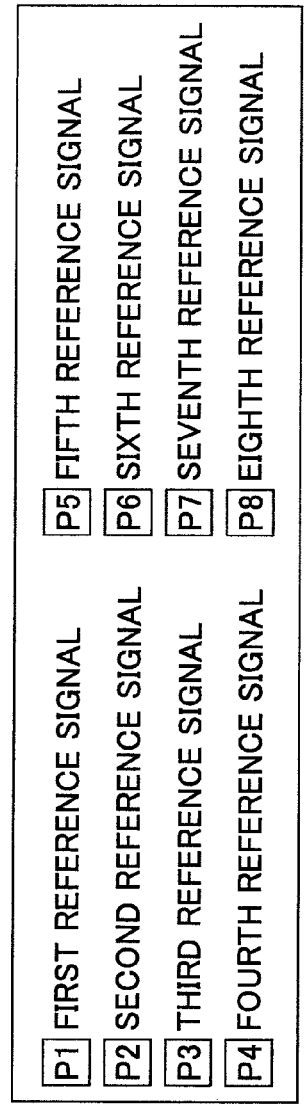
FIG.10B

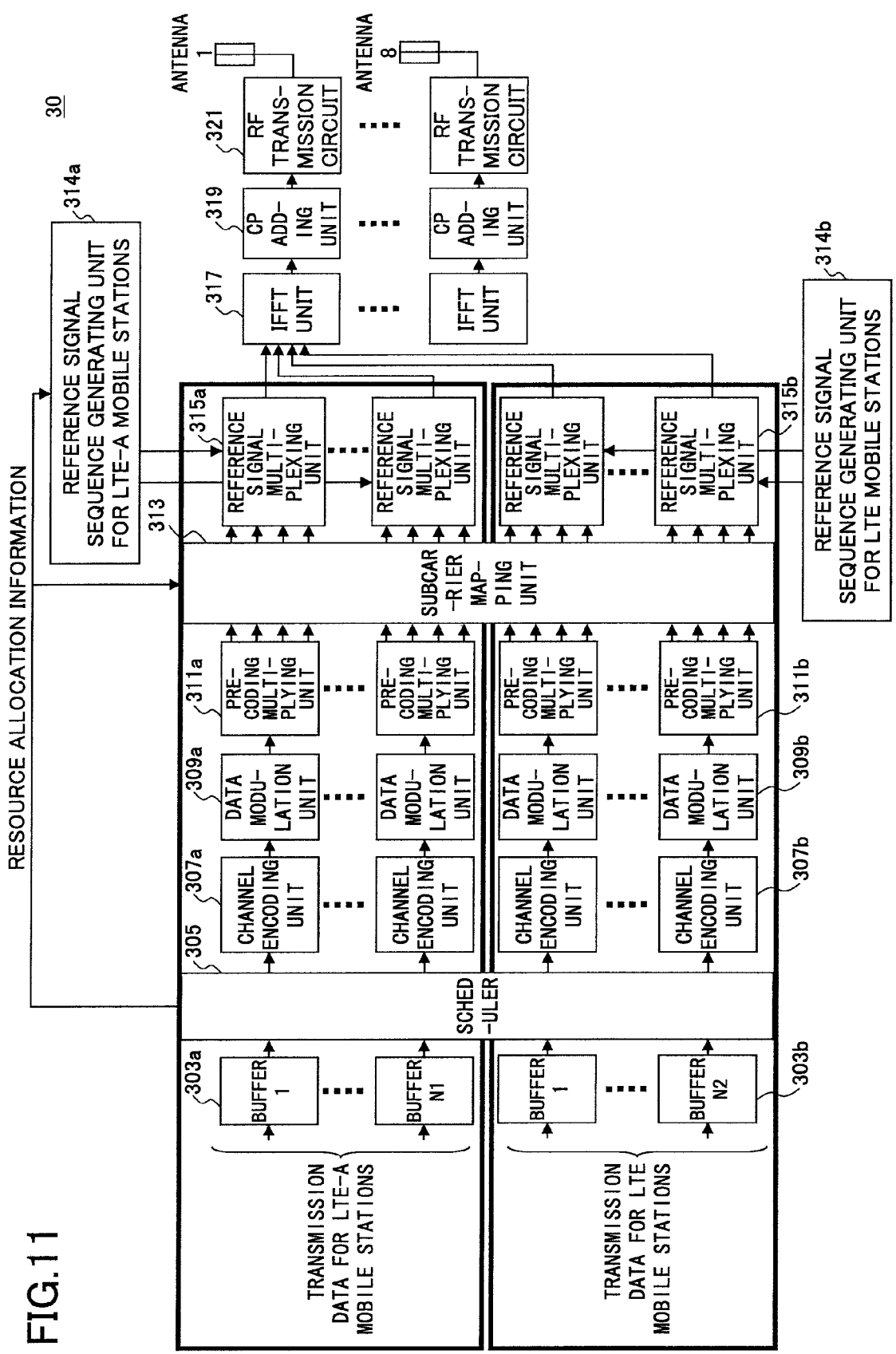

BASE STATION, USER EQUIPMENT TERMINAL AND METHOD

TECHNICAL FIELD

The present invention relates to a base station, a user equipment terminal, and a reference signal multiplexing method in a mobile communication system where plural antennas are used in the base station.

BACKGROUND ART

An MIMO (Multiple Input Multiple Output) transmission scheme in which plural antennas are used between a base station and a user equipment terminal (which is typically a mobile station and may be a fixed station) is used for communications. According to the MIMO transmission scheme, plural streams which are formed by replicating a signal stream to be transmitted, for example, are multiplied by weighting factors, and then directional beams are generated. By using the directional beams, quality of transmission signals or a transmission speed can be improved. The weighting factor used for the MIMO transmission scheme is called a precoding vector or a precoding matrix.

In an E-UTRA (Evolved UMTS Terrestrial Radio Access) system and an LTE (Long Term Evolution) system, which are standardized in 3GPP (3rd Generation Partnership Project), an MIMO transmission scheme with four transmission antennas at the maximum in downlink is used. FIG. 1 shows an arrangement of reference signals in the LTE system (see non-patent document 1). The reference signal may be defined as a predetermined bit sequence used by a receiver to receive and demodulate other symbols. Alternatively, the reference signal may be simply defined as a reference signal known to both a transmitter and a receiver. Specifically, as shown in FIG. 1, reference signals to be used for channel estimation of transmission signals from the first and second antennas are multiplexed into first, fifth, eighth, and twelfth OFDM symbols. In addition, reference signals to be used for channel estimation of transmission signals from the third and fourth antennas are multiplexed into second and ninth OFDM symbols.

[Non-patent document 1] 3GPP, TS36.211 (V8.1.0), "Physical channels and modulation (Release8)," Nov. 2007.

DISCLOSURE OF INVENTION

Problem(S) to be Solved By the Invention

In a future radio access system such as an IMT-Advanced system (also referred to as an LTE-Advanced system in 3GPP) whose features are to be discussed, the number of transmission antennas used in a base station is expected to be more than four (for example, eight transmission antennas may be used). In the case where an LTE-A mobile station (a mobile station having a UE (user equipment) capability according to the LTE-Advanced system) receives reference signals from eight antennas in the base station, it is necessary to efficiently estimate channel fluctuations for the respective transmission antennas.

On the other hand, in order to achieve smooth shift from the existing system such as the LTE system to the future radio access system, it is necessary to maintain backward compatibility with an LTE mobile station (a mobile station having a UE capability according to the LTE system) which receives reference signals from four transmission antennas. Accordingly, in the future radio access system such as the LTE-Advanced system, it is necessary to support both a mobile station such as an LTE-A mobile station for receiving downlink communications from more than four transmission antennas and a mobile station such as an LTE mobile station for receiving downlink communications from less than or equal to four transmission antennas.

It is a general object of the present invention to improve accuracy of channel estimation in downlink when plural transmission antennas are used in a base station, while enabling coexistence of both a mobile station (for example, an LTE mobile station) for receiving reference signals in downlink communications from four transmission antennas and a mobile station (for example, an LTE-A mobile station) for receiving reference signals adapted to downlink communications from more than four transmission antennas.

Means for Solving the Problem(s)

In one aspect of the present invention, there is provided a base station for transmitting reference signals, including:
a first reference signal sequence generating unit configured to generate a first reference signal sequence in which M types of reference signals are arranged;
a second reference signal sequence generating unit configured to generate a second reference signal sequence in which N (N>M) types of reference signals are arranged;
a scheduler configured to allocate resource blocks to a first mobile station and a second mobile station;
a signal multiplexing unit configured to multiplex the first reference signal sequence into the resource block allocated to the first mobile station and multiplex the second reference signal sequence into the resource block allocated to the second mobile station; and
a transmitting unit configured to transmit the first and second reference signal sequences.

In another aspect of the present invention, there is provided a mobile station for receiving reference signals from a base station, including:
a control information decoding unit configured to decode information about an arrangement of a reference signal sequence; and
a first channel estimating unit configured to perform channel estimation based on the arrangement of the reference signal sequence.

In another aspect of the present invention, there is provided a reference signal multiplexing method in a base station for multiplexing reference signals, comprising the steps of:
generating a first reference signal sequence in which M types of reference signals are arranged;
generating a second reference signal sequence in which N (N>M) types of reference signals are arranged;
allocating resource blocks to a first mobile station and a second mobile station; and
multiplexing the first reference signal sequence into the resource block allocated to the first mobile station and multiplex the second reference signal sequence into the resource block allocated to the second mobile station.

Advantageous Effect of the Invention

According to an embodiment of the present invention, accuracy of channel estimation in a mobile station can be improved when plural transmission antennas are used in a base station.

BRIEF DESCRIPTION OF THE DRAWINGS

FIG. 1 shows an arrangement of reference signals in an LTE system.

FIG. 2A schematically shows that radio resources for LTE mobile stations and radio resources for LTE-A mobile stations are segmented in the frequency axis.

FIG. 2B shows an example where plural boundaries between radio resources for LTE mobile stations and radio resources for LTE-A mobile stations are formed in the frequency axis.

FIG. 2C shows an example where plural boundaries between radio resources for LTE mobile stations and radio resources for LTE-A mobile stations are formed in both the frequency axis and the time axis.

FIG. 2D shows another example where plural boundaries between radio resources for LTE mobile stations and radio resources for LTE-A mobile stations are formed in both the frequency axis and the time axis.

FIG. 3B shows an example where plural boundaries between radio resources for LTE mobile stations and radio resources for LTE-A mobile stations are formed in the time axis.

FIG. 8A schematically shows dynamic scheduling of radio resources.

FIG. 8B schematically shows the use of both static or quasi-static segmentation and dynamic scheduling of radio resources.

FIG. 10B shows two exemplary arrangements of reference signal sequences according to the second or third embodiment of the present invention.

FIG. 11 shows a block diagram of a base station according to the second or third embodiment of the present invention.

DETAILED DESCRIPTION OF THE PREFERRED EMBODIMENTS

Figure 3A:
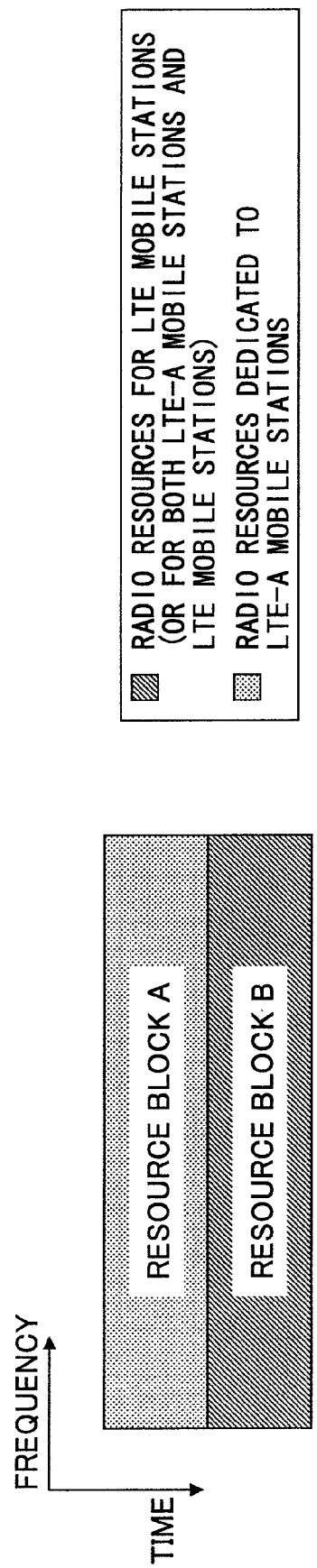
FIG. 3A schematically shows that radio resources for LTE mobile stations and radio resources for LTE-A mobile stations are segmented in the time axis.

With reference to the accompanying drawings, embodiments of the present invention are described below. The embodiments are discussed in the following sections or subsections.

1. First embodiment
1.1 Quasi-static segmentation of radio resources
1.2 Mapping of reference signals
1.3 Base station
1.4 Mobile station
1.5 Exemplary operation
2. Second embodiment
2.1 Dynamic segmentation of radio resources
2.2 Mapping of reference signals
3. Third embodiment
3.1 Mapping of reference signals
3.2 Base station
3.3 Mobile station
3.4 Exemplary operation
4. Fourth embodiment In the embodiments of the present invention, an arrangement of reference signals allowing a mobile station to perform channel estimation is described below, when more than for transmission antennas are used in a base station, for example. When more than four transmission antennas are used in the base station, the base station uses resource blocks including four types of reference signal sequences and resource blocks including more than four types of reference signal sequences. The present invention is not limited to the specific embodiments described below, but may be typically applied to the case where both a reference signal sequence in which M types of reference signals are arranged and a reference signal sequence in which N types of reference signals are arranged are used. As used herein, the reference signal sequence refers to a sequence in which reference signals are arranged on predetermined symbols in a resource block.

The base station may use a reference signal sequence adapted to downlink communications from more than four transmission antennas and a reference signal sequence adapted to downlink communications from four transmission antennas. For example, the base station transmits a reference signal sequence to be used for channel estimation of transmission signals from more than four transmission antennas and a reference signal sequence to be used for channel estimation of transmission signals from four transmission antennas among the more than for transmission antennas. When the mobile station receives reference signals, the mobile station performs channel estimation based on which of the reference signal sequences is used.

The embodiments are described below with reference to an LTE-A mobile station (LTE-A terminal) and an LTE mobile station (LTE-A terminal). The LTE-A mobile station is a mobile station for receiving N types of reference signals adapted to downlink communications from N transmission antennas (for example, eight transmission antennas). The LTE mobile station is a mobile station for receiving reference signals adapted to downlink communications from M (M<N) transmission antennas (for example, four transmission antennas). However, the present invention may be applied to any other system in which plural transmission antennas are used in the base station.

1. First Embodiment
1.1 Quasi-Static Segmentation of Radio Resources

FIG. 2A shows an arrangement of radio resources in the case where both LTE mobile stations and LTE-A mobile stations coexist in an LTE-Advanced system. In a first embodiment of the present invention, the system band is segmented in the frequency direction into a frequency band (resource blocks A) to be used by LTE-A mobile stations for communications and a frequency band (resource blocks B) to be used by the LTE mobile stations for communications. These resource blocks refer to resources within the whole system band, including plural resources each corresponding to a resource allocation unit, rather than refer to the resource allocation unit such as a radio resource occupying a bandwidth of 180 kHz and a time period of 1 ms. The LTE-A mobile station communicates using one or more resource blocks (resource allocation units) included in the resource blocks A. The LTE mobile station communicates using one or more resource blocks (resource allocation units) included in the resource blocks B. By segmenting the frequency band in this manner, LTE-A mobile stations can communicate in the resource blocks A. Thus, the base station can multiplex common reference signals into resource blocks A (resource allocation units) with an arrangement suitable for the LTE-A mobile stations. In addition, LTE mobile stations can communicate in the resource blocks B. Thus, the base station can multiplex common reference signals into resource blocks B (resource allocation units) with an arrangement suitable for the LTE mobile stations.

As used herein, the common reference signals refer to reference signals used in common by plural mobile stations within the same cell. The common reference signals transmitted in the resource blocks A are used by plural LTE-A mobile stations within the cell to perform channel estimation or the like. The common reference signals transmitted in the resource blocks B are used by plural LTE mobile stations within the cell to perform channel estimation or the like.

The boundary in the frequency axis between the resource blocks A and the resource blocks B may be constantly fixed in the system or may be variable depending on any factor. For example, the boundary may be quasi-statically variable depending on a traffic volume, the number of subscribers, or the like. While the concept of quasi-static variations is included in the concept of dynamic variations, the concept of quasi-static variations specifically corresponds to the case where a time period or interval in variations in the boundary is significantly long. For example, while the dynamic variations may correspond to variations at every subframe of 1 ms, the quasi-static variations may correspond to variations at every 100 ms. It should be noted that these numerical values are merely for illustrative purposes and any other appropriate value may be used, since dynamic variations, static variations, and quasi-static variations are mutually relative concepts. The case where the boundary is dynamically variable is described in a second embodiment of the present invention. The boundary between the resource blocks A and the resource blocks B may be transmitted to all mobile stations within the cell using common control information such as a broadcast channel.

Segmenting the resource blocks A and the resource blocks B in the frequency axis in this manner has an advantage of minimum changes in the device configuration for LTE mobile stations, because the LTE mobile stations can continue to use the conventional frequency band, for example.

FIG. 3A shows a different approach for segmenting radio resources in the case where both LTE mobile stations and LTE-A mobile stations coexist. As shown in FIG. 3A, resource blocks A to be used by LTE-A mobile stations for communications and resource blocks B to be used by the LTE mobile stations for communications may be segmented in the time direction. Similar to the example shown in FIG. 2A, the base station can multiplex common reference signals into resource blocks A (resource allocation units) with an arrangement suitable for the LTE-A mobile stations. In addition, the base station can multiplex common reference signals into resource blocks B (resource allocation units) with an arrangement suitable for the LTE mobile stations.

Segmenting the resource blocks A and the resource blocks B in the time axis in this manner has an advantage of making available frequency ranges wider for both LTE mobile stations and LTE-A mobile stations. In addition, segmenting radio resources in the time axis is also preferable from the viewpoint of saving the battery, for example, because a mobile station need only operate during a time period in which signals associated with the mobile station arrive.

While a single boundary is formed in the frequency axis or the time axis in FIG. 2A or 3A, plural boundaries may be formed.

FIG. 2B shows an example where plural boundaries between radio resources for LTE mobile stations and radio resources for LTE-A mobile stations are formed in the frequency axis. In the shown example, these boundaries are regularly formed. The number of boundaries, a ratio of resources, or the like in segmenting radio resources is not limited to the shown example, but any other value may be used. Segmenting radio resources using plural boundaries in the frequency axis in this manner has an advantage of making available frequency ranges wider for both LTE mobile stations and LTE-A mobile stations. In addition, segmenting radio resources in this manner is also preferable from the viewpoint of reducing delay, for example, because radio resources can be continuously reserved in the time axis.

FIG. 3B shows an example where plural boundaries between radio resources for LTE mobile stations and radio resources for LTE-A mobile stations are formed in the time axis. In the shown example, these boundaries are regularly formed. The number of boundaries, a ratio of resources, or the like in segmenting radio resources is not limited to the shown example, but any other value may be used. Increasing the number of boundaries in segmenting radio resources in the time axis is preferable from the viewpoint of reducing a time period during which radio resources cannot be continuously used, for example.

Alternatively, resource blocks may be quasi-statically segmented in both the time direction and the frequency direction by the combination of the examples shown in FIGS. 2A and 3A.

FIG. 2C shows an example where plural boundaries between radio resources for LTE mobile stations and radio resources for LTE-A mobile stations are formed in both the frequency axis and the time axis. FIG. 2D shows another example where plural boundaries between radio resources for LTE mobile stations and radio resources for LTE-A mobile stations are formed in both the frequency axis and the time axis.

It should be noted that the radio resources dedicated to LTE-A mobile stations in FIGS. 2A-2C may be used by LTE terminals. In other words, the radio resources dedicated to LTE-A mobile stations may be allocated to an LTE mobile station (first mobile station). However, allocating the radio resources dedicated to LTE-A mobile stations to the LTE mobile station may degrade reception quality in the LTE mobile station to some extent, due to reference signals dedicated to LTE-A mobile stations. The meaning or interpretation of "dedicated" is applied to the drawings other than FIGS. 2A-2C as well as the whole specification.

1.2 Mapping of Reference Signals

Figure 4:
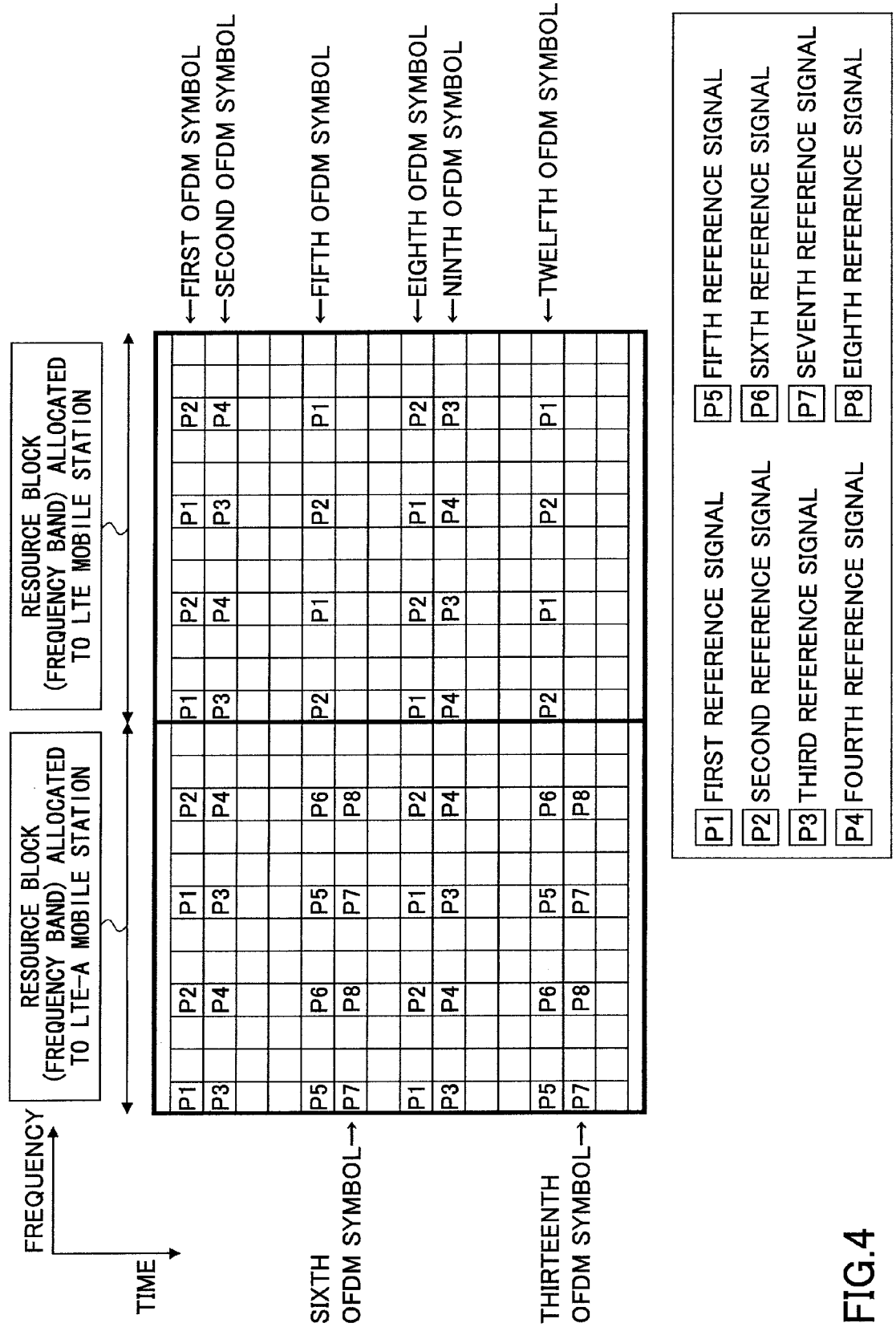
FIG. 4 shows an exemplary arrangement of reference signal sequences according to a first embodiment of the present invention.

FIG. 4 shows an exemplary arrangement of reference signal sequences according to the first embodiment of the present invention. It is assumed that the base station includes eight transmission antennas. Eight types of reference signal sequences (P1-P8) suitable for LTE-A mobile stations are arranged in a resource block allocated to an LTE-A mobile station. On the other hand, four types of reference signal sequences are arranged in a resource block allocated to an LTE mobile station. In the context of this embodiment, the resource block corresponds to a radio resource allocation unit for each mobile station (a unit of allocating a radio resource to each mobile station). The resource block suitable for LTE-A mobile stations has the same arrangement in part as the resource block suitable for LTE mobile stations. In the shown example, the arrangement of first and second OFDM symbols in one resource block is in common with the arrangement in the other resource block. Arranging reference signal sequences at least in part in common in this manner allows LTE mobile stations to be supported in the LTE-A system.

In the first embodiment, the arrangement of the reference signal sequence suitable for LTE-A mobile stations may be different from that of the reference signal sequence suitable for LTE mobile stations, because the resource blocks A used by LTE-A mobile stations for communications and the resource blocks B used by LTE mobile stations for communications are segmented in advance.

In FIG. 4, the number of symbols in one of four types of reference signals in the resource block allocated to the LTE mobile station is the same as the number of symbols in another of the four types of reference signals. In addition, the number of symbols in one of eight types of reference signals in the resource block allocated to the LTE-A mobile station is the same as the number of symbols in another of the eight types of reference signals. Alternatively, the number of symbols in one of four types of reference signals in the resource block allocated to the LTE mobile station may have a predetermined relationship (for example, a fixed ratio) with the number of symbols in another of the four types of reference signals. In addition, the number of symbols in one of eight types of reference signals in the resource block allocated to the LTE-A mobile station may have a predetermined relationship (for example, a fixed ratio) with the number of symbols in another of the eight types of reference signals. For example, in the resource block allocated to the LTE mobile station, the number of symbols in the first or second reference signal may be twice of the number of symbols in the third or fourth reference signal. For example, in the resource block allocated to the LTE-A mobile station, the number of symbols in one of the first through fourth reference signals may be twice of the number of symbols in one of the five through eighth reference signals. The predetermined relationship may be determined based on any value such as a ratio in the resource block, the number of symbols, or a density. This meaning or interpretation of "the predetermined relationship" can be applied to the other embodiments of the present invention.

According to the first embodiment, it is possible to arrange a common reference signal sequence suitable for LTE mobile stations in a resource block allocated to an LTE mobile station and to arrange a common reference signal sequence suitable for LTE-A mobile stations in a resource block allocated to an LTE-A mobile station. In addition, since reference signals can be quasi-statically allocated in continuous frequency or time resources, the LTE mobile station or the LTE-A mobile station can perform channel estimation using reference signals in the allocated resource block as well as reference signals in adjacent resource blocks. As a result, accuracy of channel estimation in downlink can be improved.

1.3 Base Station

Figure 5:
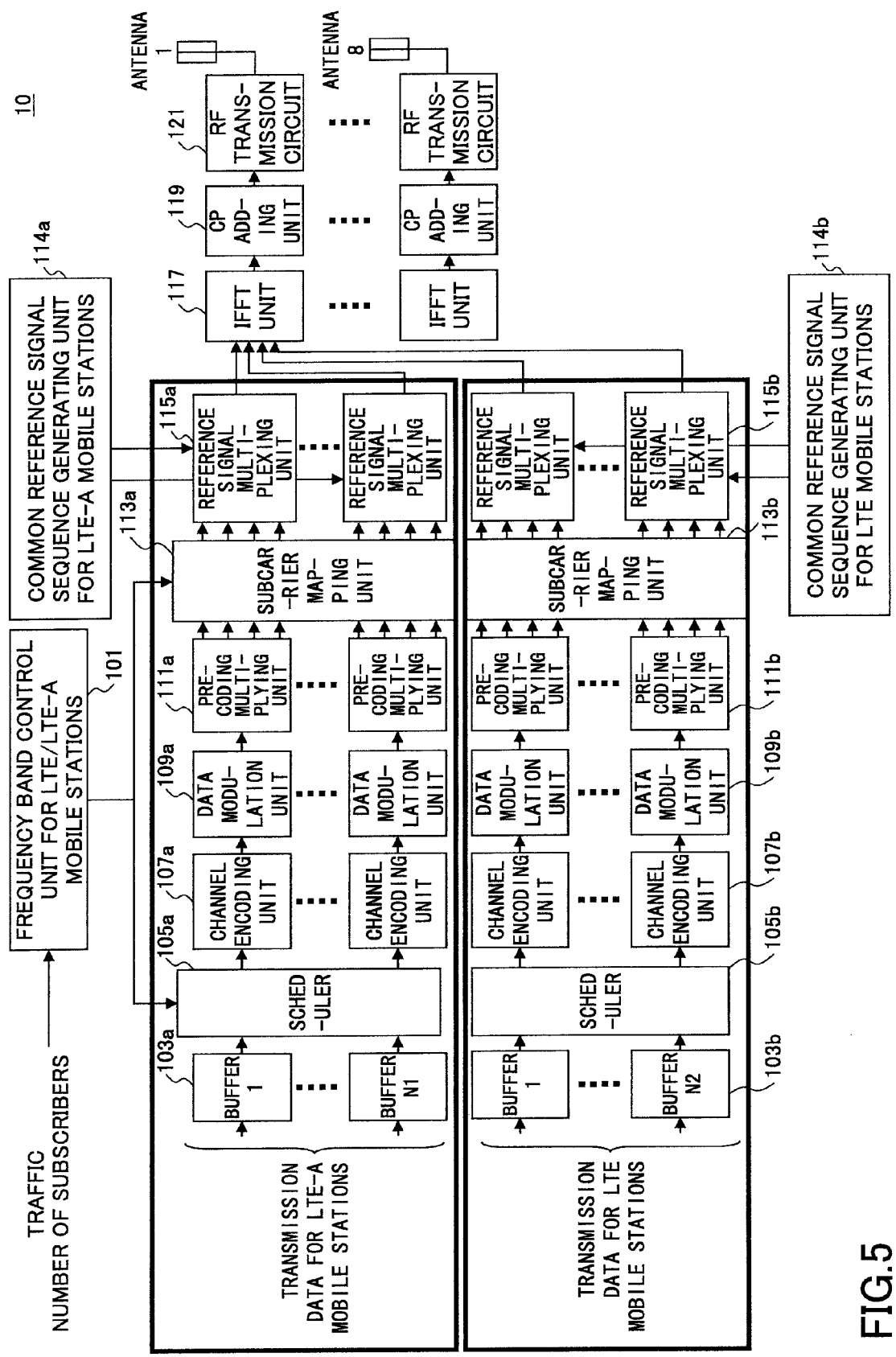
FIG. 5 shows a block diagram of a base station according to the first embodiment of the present invention.

With reference to FIG. 5, a configuration of a base station 10 according to the first embodiment of the present invention is described below. The base station 10 includes a frequency band control unit 101. The base station 10 further includes buffers for LTE-A mobile stations 103a, a scheduler 105a, channel encoding units 107a, data modulation units 109a, precoding multiplying units 111a, a subcarrier mapping unit 113a, a reference signal sequence generating unit 114a, and reference signal multiplexing units 115a. The base station 10 further includes buffers for LTE mobile stations 103b, a scheduler 105b, channel encoding units 107b, data modulation units 109b, precoding multiplying units 111b, a subcarrier mapping unit 113b, a reference signal sequence generating unit 114b, and reference signal multiplexing units 115b. The base station 10 further includes IFFT (Inverse Fast Fourier Transform) units 117, CP (Cyclic Prefix) adding units 119, and RF (Radio Frequency) transmission circuits 121 for respective antennas.

While the base station 10 includes eight transmission antennas in the shown example, the base station 10 may include any number of antennas more than or equal to two antennas. In addition, the base station 10 is mere an example of a base station according to a precoding MIMO transmission scheme, in which the same data are replicated, multiplied with precoding weights for the respective transmission antennas, and transmitted from the plural transmission antennas. When precoding is not applied, the base station 10 may not include the precoding multiplying units 111a and 111b, for example.

The frequency band control unit 101 segments a frequency band to be allocated to LTE mobile stations and a frequency band to be allocated to LTE-A mobile stations depending on a traffic volume, the number of subscribers, or the like. Information about these frequency bands is provided as control information to each mobile station via a broadcast channel. It should be noted that, when resource blocks to be allocated to LTE mobile stations and resource blocks to be allocated to LTE-A mobile stations are segmented in the time direction as shown in FIGS. 3A, 3B, 2C, and 2D, the base station 10 includes a transmission time interval control unit instead of the frequency band control unit 101. In this case, the transmission time interval control unit segments transmission time intervals to be allocated to LTE mobile stations and transmission time intervals to be allocated to LTE-A mobile stations depending on a traffic volume, the number of subscribers, or the like.

Each of the buffers for LTE-A mobile stations 103a stores transmission data to be transmitted to each of N1 LTE-A mobile stations within the cell of the base station 10.

The scheduler 105a for LTE-A mobile stations allocates resource blocks to the transmission data stored in the buffers 103a. The scheduler 105a obtains information about the frequency band to be allocated to LTE-A mobile stations from the frequency band control unit 101 and allocates resource blocks within this frequency band.

Each of the cannel encoding units 107a for LTE-A mobile stations selects a channel coding rate based on channel quality information (CQI: Channel Quality Indicator) fed back from the LTE-A mobile station, and then performs channel encoding of the transmission data. Each of the data modulation units 109a selects a modulation scheme based on the channel quality information fed back from the LTE-A mobile station, and then performs data modulation of the transmission data. Each of the precoding multiplying units 111a multiplies the transmission data with a precoding matrix based on precoding matrix information (PMI: Precoding Matrix Indicator) fed back from the LTE-A mobile station.

The subcarrier mapping unit 113a for LTE-A mobile stations maps the transmission data to subcarriers. The subcarrier mapping unit 113a obtains information about the frequency band to be allocated to LTE-A mobile stations from the frequency band control unit 101 and maps the transmission data to subcarriers within this frequency band.

The reference signal sequence generating unit 114*a* for LTE-A mobile stations generates a common reference signal sequence for LTE-A mobile stations as shown in the left side of FIG. 4, for example.

Each of the reference signal multiplexing units 115*a* for LTE-A mobile stations multiplexes the common reference signal sequence for LTE-A mobile stations into a resource block allocated to the LTE-A mobile station.

The buffers for LTE mobile stations 103*b* through the reference signal multiplexing units 115*b* perform the same operations in terms of N2 LTE mobile stations as the buffers for LTE-A mobile stations 103*a* through the reference signal multiplexing units 115*a*. It should be noted that the reference signal sequence generating unit 114*b* generates a common reference signal sequence for LTE mobile stations as shown in the right side of FIG. 4, for example. Each of the reference signal multiplexing units 115*b* for LTE mobile stations multiplexes the common reference signal sequence for LTE mobile stations into a resource block allocated to the LTE mobile station.

Transmission signals into which the common reference signals are multiplexed undergo inverse fast Fourier transform in the IFFT units 117 to be converted into the time domain for the respective antennas. Then, the CP adding units 119 insert guard intervals (CPs) into the transmission signals, which are then transmitted from the RF transmission circuits 121 to each mobile station.

1.4 Mobile Station

Figure 6:
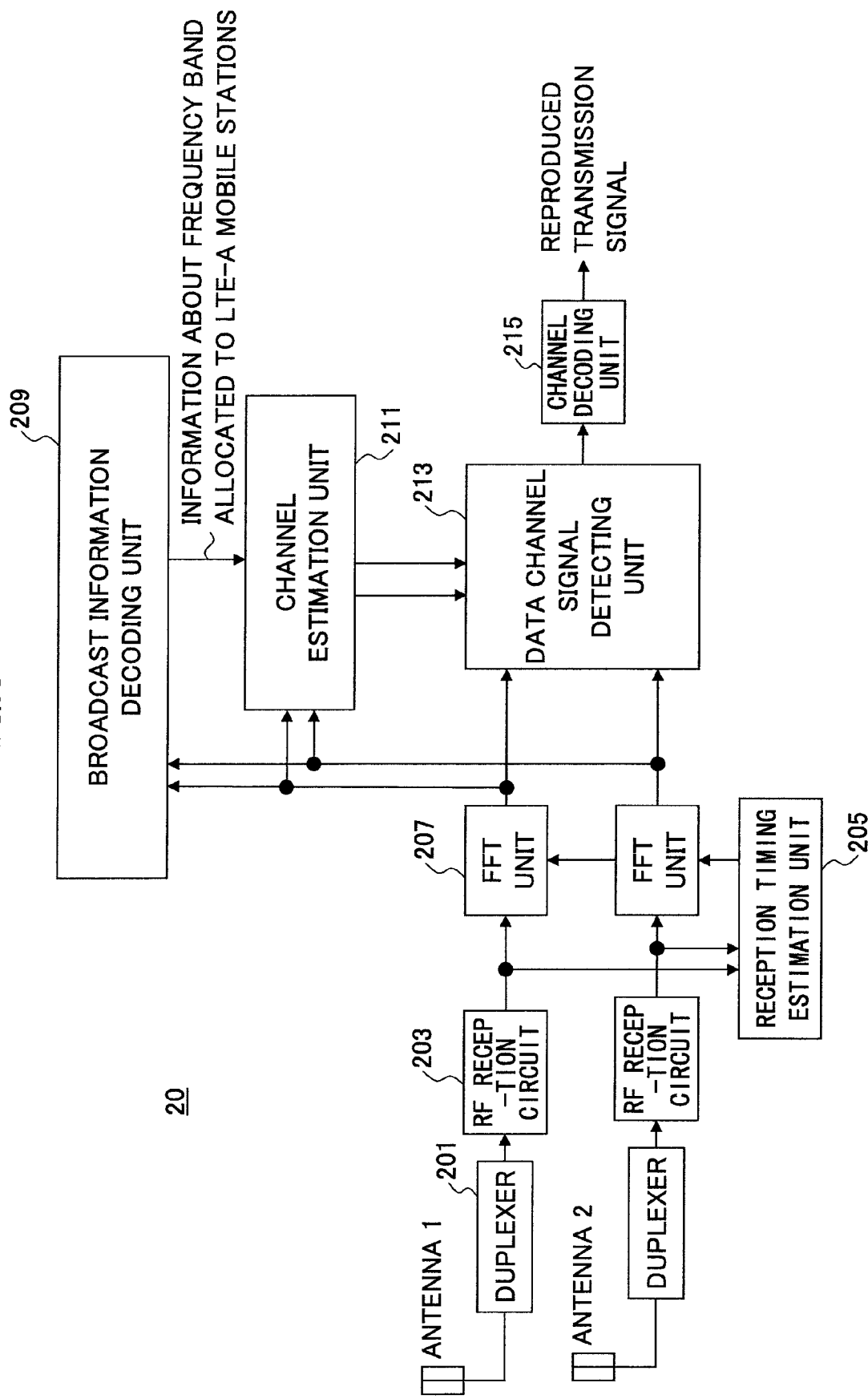
FIG. 6 shows a block diagram of a mobile station according to the first embodiment of the present invention.

With reference to FIG. 6, a configuration of a mobile station 20 according to the first embodiment of the present invention is described below. The mobile station 20 corresponds to a mobile station such as an LTE-A mobile station for receiving reference signals adapted to downlink communications from N transmission antennas (for example, eight transmission antennas) in the base station. The mobile station 20 includes duplexers 201, RF reception circuits 203, a reception timing estimation unit 205, FFT (Fast Fourier Transform) units 207, a broadcast information decoding unit 209, a channel estimation unit 211, a data channel signal detecting unit 213, and a channel decoding unit 215. While the mobile station 20 includes two antennas in the shown example, the mobile station 20 may include one antenna or more than two antennas.

Each of the RF reception circuits 203 receives signals from the base station via each of the duplexers 201 and performs predetermined signal processing for converting the received signals into baseband digital signals. This signal processing may include power amplification, band limiting, and analog-to-digital conversion, for example. The reception timing estimation unit 205 estimates the reception timings of the received signals supplied from the RF reception circuits 203. The reception timing estimation unit 205 may use guard intervals (CPs) added by the base station to estimate the reception timings. Each of the FFT units 207 performs Fourier transform of the received signals supplied from each of the RF reception circuits 203 based on the reception timings supplied from the reception timing estimation unit 205.

The broadcast information decoding unit 209 decodes control information provided via the broadcast channel from the received signals which have been undergone Fourier transform in the FFT units 207. Then, the broadcast information decoding unit 209 obtains information about the frequency band allocated to LTE-A mobile stations. The arrangement of the common reference signal sequence suitable for LTE-A mobile stations is understood from this control information.

For example, it is understood that the arrangement shown in the left side of FIG. 4 is used for the common reference signal sequence.

The channel estimation unit 211 performs channel estimation using the common reference signal sequence suitable for LTE-A mobile stations for the purpose of decoding data. The amount of phase rotation and/or the amount of amplitude variation in the propagation path are obtained in the channel estimation.

The data channel signal detecting unit 213 demodulates data using the result of channel estimation in the channel estimation unit 211. The channel decoding unit 215 decodes the data modulated by the data channel signal detecting unit 213 and reproduces the signals transmitted from the base station.

1.5 Exemplary Operation

Figure 7:
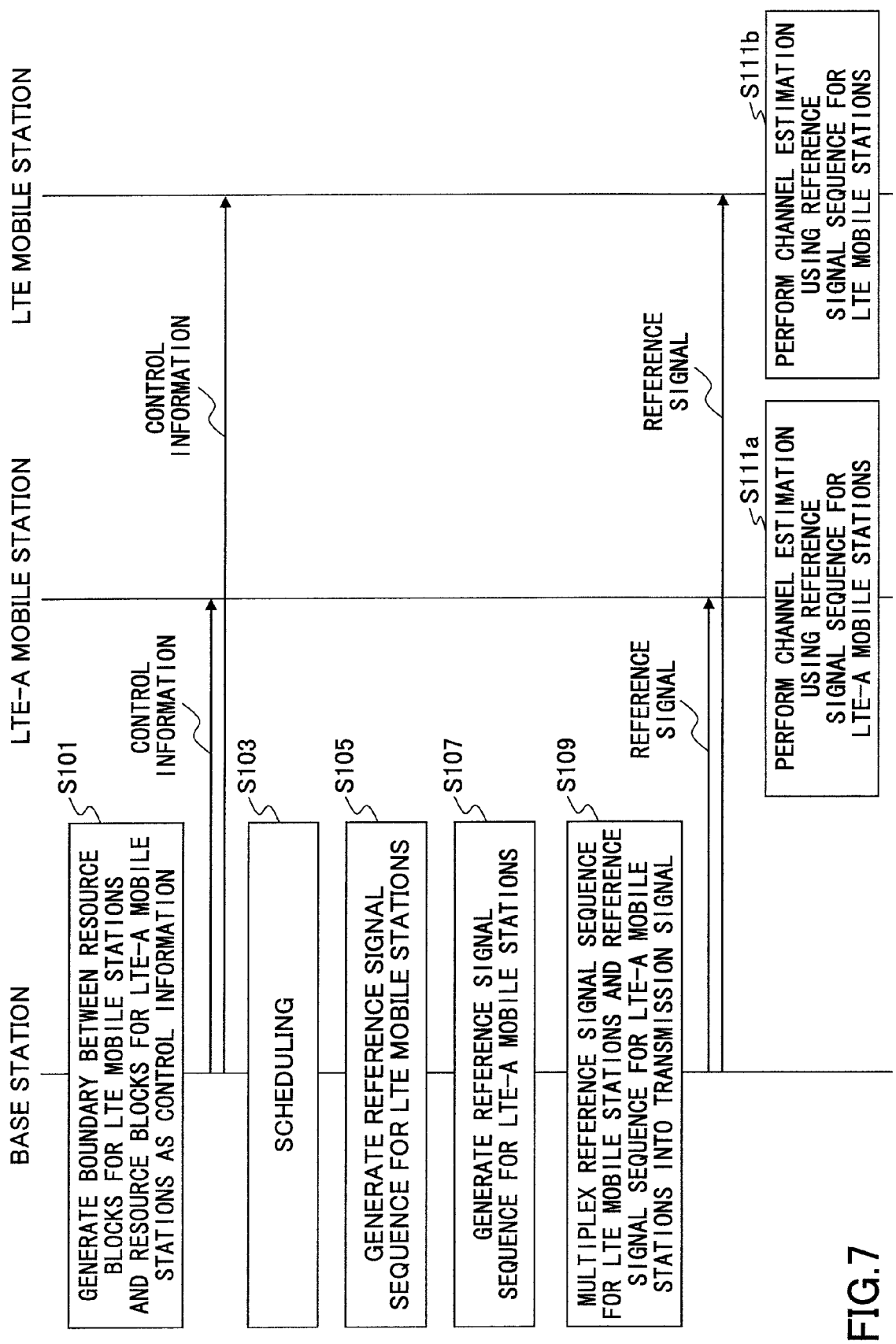
FIG. 7 shows a reference signal multiplexing and channel estimation method according to the first embodiment of the present invention.

With reference to FIG. 7, a reference signal multiplexing and channel estimation method according to the first embodiment of the present invention is described below.

The base station generates, as control information transmitted via the broadcast channel, information about resource blocks to be allocated to LTE mobile stations and resource blocks to be allocated to LTE-A mobile stations (S101). It should be noted that step S101 may be performed at a different timing from steps S103-111.

The base station performs scheduling for LTE mobile stations and LTE-A mobile stations to allocate resource blocks to the respective mobile stations (S103). The base station generates a reference signal sequence for LTE mobile stations, as shown in the right side of FIG. 4, for example (S105). The base station also generates a reference signal sequence for LTE-A mobile stations, as shown in the left side of FIG. 4, for example (S107). Then, the base station multiplexes the reference signal sequence for LTE mobile stations into the resource block allocated to the LTE mobile station and multiplexes the reference signal sequence for LTE-A mobile stations into the resource block allocated to the LTE-A mobile station (S109). Transmission signals into which the reference signals are multiplexed are transmitted to the LTE mobile station and the LTE-A mobile station.

The LTE-A mobile station performs channel estimation using the common reference signal sequence suitable for LTE-A mobile stations (S111*a*). The LTE mobile station performs channel estimation using the common reference signal sequence for LTE mobile stations (S111*b*).

2. Second Embodiment

In the first embodiment, the resource blocks A to be allocated to LTE-A mobile stations and the resource blocks B to be allocated to LTE mobile stations are quasi-statically segmented. In a second embodiment of the present invention, resource blocks A to be allocated to LTE-A mobile stations and resource blocks B to be allocated to LTE mobile stations are dynamically (for each subframe) determined by the scheduler.

2.1 Dynamic Segmentation of Radio Resources

FIG. 8A shows an arrangement of radio resources to be dynamically allocated to LTE mobile stations and LTE-A mobile stations in the case where both LTE mobile stations and LTE-A mobile stations coexist in an LTE-Advanced system. For example, the scheduler in the base station allocates optimum resource blocks to the LTE mobile station and the LTE-A mobile station based on channel quality information (CQI) reported from each mobile station. Thus, resource blocks A to be allocated to LTE-A mobile stations and resource blocks B to be allocated to LTE mobile stations may vary for each subframe.

The base station multiplexes a reference signal sequence suitable for LTE-A mobile stations into the resource blocks A allocated to the LTE-A mobile stations. The reference signal sequence suitable for LTE-A mobile stations is formed by multiplexing antenna-orthogonal dedicated reference signals into a reference signal sequence for LTE terminals. In addition, the base station multiplexes a reference signal sequence including common reference signals suitable for LTE mobile stations into the resource blocks B allocated to the LTE mobile stations. As used herein, the dedicated reference signals refer to reference signals whose arrangement varies depending on mobile stations (the arrangement of the dedicated reference signal for LTE-A mobile stations is different from that for LTE mobile stations). The antenna-orthogonal reference signals mean that reference signals to be used for channel estimation of signals transmitted from each antenna are orthogonal in the frequency direction or the time direction. Thus, the antenna-orthogonal dedicated reference signals suitable for LTE-A mobile stations are used by LTE-A mobile stations within the cell to perform channel estimation.

The arrangement of the reference signal sequence suitable for LTE-A mobile stations is, preferably in part or in whole, in common with the arrangement of the reference signal sequence suitable for LTE mobile stations so that the LTE mobile stations can perform channel estimation using resource blocks allocated to the LTE mobile stations as well as resource blocks allocated to the LTE-A mobile stations. Portions common to both of the reference signal sequences can be used by LTE mobile stations and LTE-A mobile stations within the cell to perform channel estimation. Using reference signals in resource blocks allocated to LTE-A mobile stations, the LTE mobile station can perform scheduling, selection of a modulation scheme, selection of a coding rate, selection of a precoding vector in MIMO transmission, measurement of reception quality for handover selection, or the like.

Information indicating that resource blocks are allocated to LTE-A mobile stations (i.e., information indicating the arrangement of the reference signal sequence for LTE-A mobile stations) is provided to each mobile station as L1/L2 control information. The L1/L2 control information indicating that resource blocks are allocated to LTE-A mobile stations may be encoded together with or separately from information about a modulation scheme, a coding rate, or retransmission.

2.2 Mapping of Reference Signals

Figure 9:
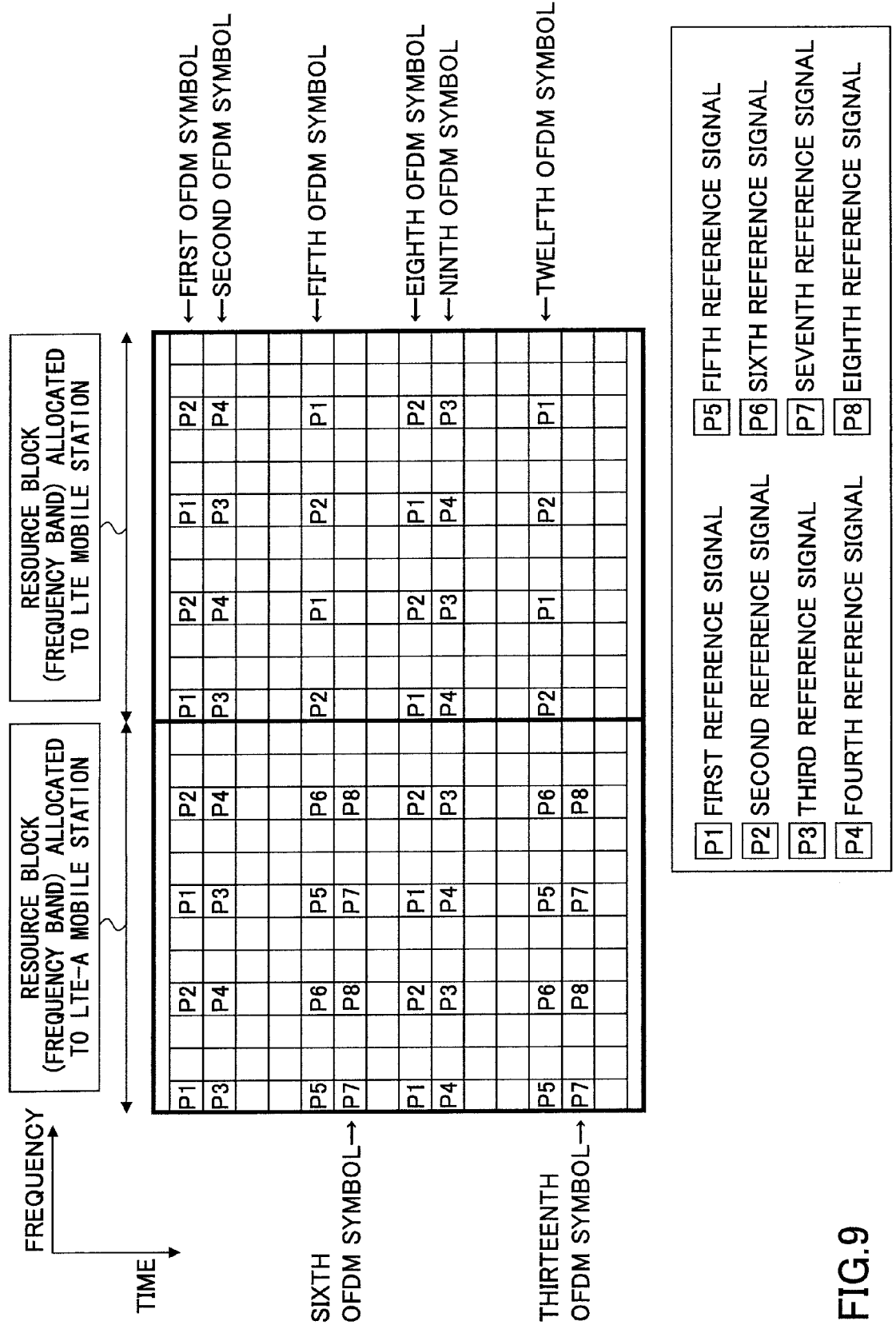
FIG. 9 shows an exemplary arrangement of reference signal sequences according to a second embodiment of the present invention.

FIG. 9 shows an exemplary arrangement of reference signal sequences according to the second embodiment of the present invention. It is assumed that the base station includes eight transmission antennas. While the arrangement of reference signal sequences shown in FIG. 9 is the same as the arrangement of reference signal sequences shown in FIG. 4, the arrangement shown in FIG. 9 may be different from the arrangement shown in FIG. 4. Eight types of reference signals suitable for LTE-A mobile stations are arranged in a resource block allocated to an LTE-A mobile station. On the other hand, four types of reference signals are arranged in a resource block allocated to an LTE mobile station. The resource block suitable for LTE-A mobile stations has the same arrangement in part as the resource block suitable for LTE mobile stations. In the shown example, the arrangement of first and second OFDM symbols in one resource block is in common with the arrangement in the other resource block. Arranging reference signal sequences at least in part in common in this manner allows LTE mobile stations to be supported in the LTE-A system.

On the other hand, in fifth, sixth, twelfth, and thirteenth OFDM symbols, part of the reference signal sequence suitable for LTE mobile stations is removed, and reference signals to be used for channel estimation of transmission signals from fifth through eighth antennas are added. In this case, the number of symbols in one of eight types of reference signals is the same as the number of symbols in another of the eight types of reference signals. Alternatively, the number of symbols in one of four types of reference signals in the resource block allocated to the LTE mobile station may have a predetermined relationship (for example, a fixed ratio) with the number of symbols in another of the four types of reference signals. In addition, the number of symbols in one of eight types of reference signals in the resource block allocated to the LTE-A mobile station may have a predetermined relationship (for example, a fixed ratio) with the number of symbols in another of the eight types of reference signals. For example, in the resource block allocated to the LTE mobile station, the number of symbols in the first or second reference signal may be twice of the number of symbols in the third or fourth reference signal. For example, in the resource block allocated to the LTE-A mobile station, the number of symbols in one of the first through fourth reference signals may be twice of the number of symbols in one of the five through eighth reference signals.

As described in the first embodiment, the arrangement of reference signal sequences shown in FIG. 9 can be also applied to the case where resource blocks A to be used by LTE-A mobile stations for communications and resource blocks B to be used by LTE mobile stations for communications are quasi-statically segmented in the frequency direction or the time direction.

FIG. 8B schematically shows that dynamic scheduling is performed in radio resources available for both LTE mobile stations and LTE-A mobile stations, when radio resources are statically or quasi-statically segmented according to the first embodiment as shown in FIG. 3B.

According to the second embodiment, the resource blocks A to be allocated to LTE-A mobile stations and the resource blocks B to be allocated to LTE mobile stations are dynamically determined by the scheduler. Thus, high flexibility due to scheduling can be achieved and the effect of scheduling (scheduling gain) can be improved. Accordingly, radio resources can be efficiently used and throughput can be improved. In addition, LTE-A mobile stations can improve accuracy of channel estimation by using dedicated reference signals. Furthermore, by making the arrangement of reference signals suitable for LTE-A mobile stations, at least in part, in common with the arrangement of reference signals suitable for LTE mobile stations, LTE-A mobile stations need not demodulate differently depending on reference signals. LTE mobile stations can also perform channel estimation in resource blocks allocated to LTE-A mobile stations.

3. Third Embodiment 3.1 Mapping of Reference Signals

Figure 10A:
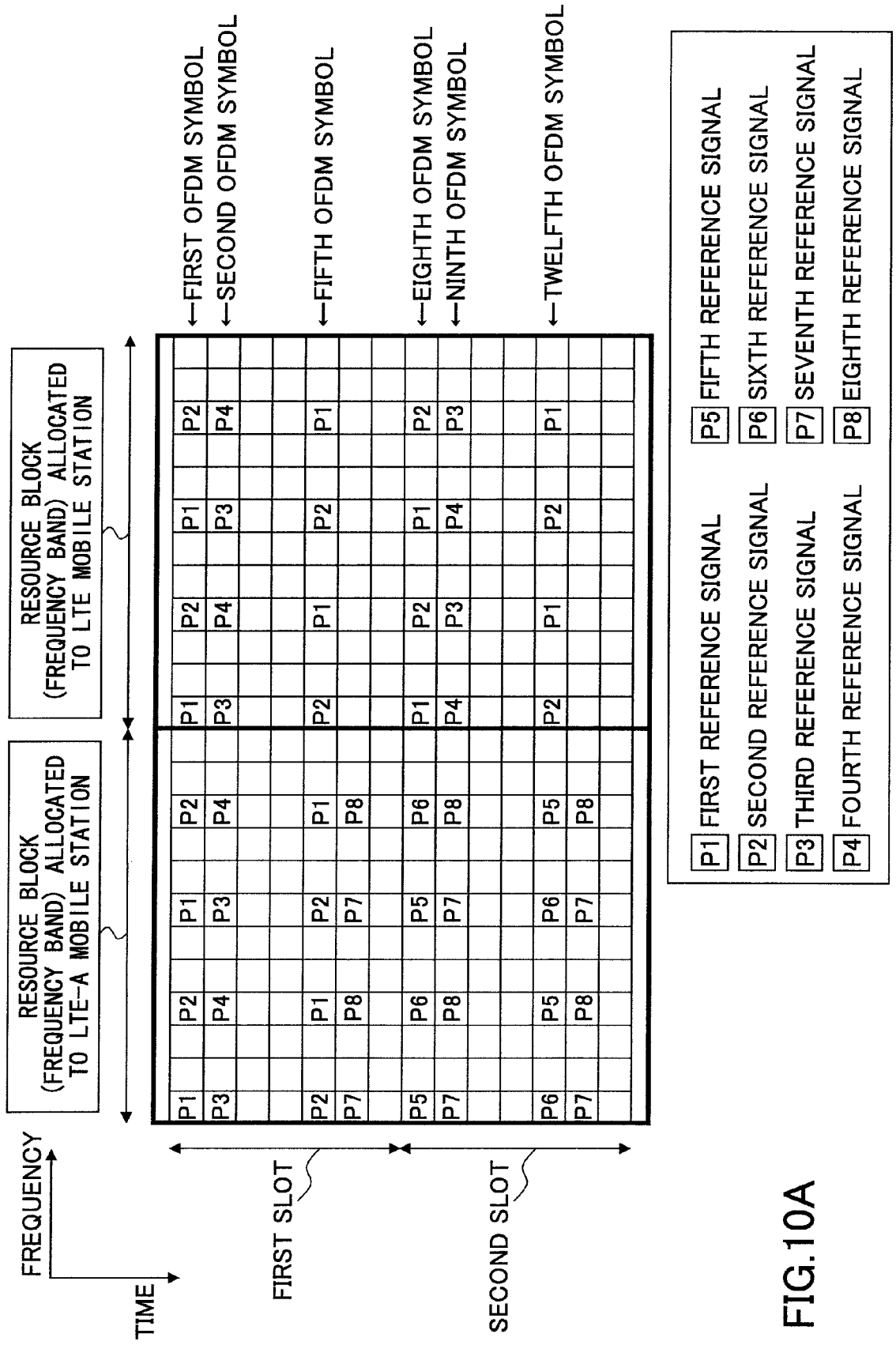
FIG. 10A shows an exemplary arrangement of reference signal sequences according to a third embodiment of the present invention.

FIG. 10A shows an exemplary arrangement of reference signal sequences according to a third embodiment of the present invention. It is assumed that the base station includes eight transmission antennas. Eight types of reference signals suitable for LTE-A mobile stations are arranged in a resource block allocated to an LTE-A mobile station. On the other hand, four types of reference signals are arranged in a resource block allocated to an LTE mobile station. The resource block suitable for LTE-A mobile stations has the same arrangement in part as the resource block suitable for LTE mobile stations. In the shown example, the arrangement of first, second, and fifth OFDM symbols in one resource block is in common with the arrangement in the other resource block. Arranging reference signal sequences at least in part in common in this manner allows LTE mobile stations to be supported in the LTE-A system.

In the resource block allocated to the LTE-A mobile station, a reference signal sequence suitable for LTE-A mobile stations is arranged so as not to increase overhead of reference signals. Specifically, part of the reference signal sequence suitable for LTE mobile stations (as shown in FIG. 1) is removed, and reference signals to be used for channel estimation of transmission signals from fifth through eighth antennas are multiplexed into the removed portions. For example, reference signals in eighth, ninth, and twelfth OFDM symbols are used as reference signals for fifth through eighth antennas. In this case, the number of symbols in one of eight types of reference signals is the same as the number of symbols in another of the eight types of reference signals. Alternatively, the number of symbols in one of four types of reference signals in the resource block allocated to the LTE mobile station may have a predetermined relationship (for example, a fixed ratio) with the number of symbols in another of the four types of reference signals. In addition, the number of symbols in one of eight types of reference signals in the resource block allocated to the LTE-A mobile station may have a predetermined relationship (for example, a fixed ratio) with the number of symbols in another of the eight types of reference signals. For example, in the resource block allocated to the LTE mobile station, the number of symbols in the first or second reference signal may be twice of the number of symbols in the third or fourth reference signal. For example, in the resource block allocated to the LTE-A mobile station, the number of symbols in one of the first through fourth reference signals may be twice of the number of symbols in one of the five through eighth reference signals.

The third embodiment is preferable from the viewpoint of reducing overhead, since the ratio of the reference signal sequence in the resource block for LTE-A terminals is lower compared to the second embodiment. In addition, by making the arrangement of the reference signal sequence suitable for LTE-A mobile stations, at least in part, in common with the arrangement of the reference signal sequence suitable for LTE mobile stations, LTE-A mobile stations can perform channel estimation based on portions common to both of the reference signal sequences as well as based on different portions. LTE mobile stations can also perform channel estimation based on the portions common to both of the reference signal sequences.

FIG. 10B shows two exemplary arrangements of reference signal sequences according to the second or third embodiment of the present invention. According to these examples, reference signal sequences (P1-P4) for LTE mobile stations are arranged in common with those for LTE-A mobile stations. In addition, reference signal sequences (P5-P8) are added in a resource block for LTE-A mobile stations. These exemplary arrangements are preferable from the viewpoint of commonality of places in which the reference signal sequences are arranged.

3.2 Base Station

With reference to FIG. 11, a configuration of a base station 30 is described below. The base station 30 is applicable to both the second embodiment and the third embodiment. The base station 30 includes a scheduler 305 and a subcarrier mapping unit 313. The base station 30 further includes buffers for LTE-A mobile stations 303a, channel encoding units 307a, data modulation units 309a, precoding multiplying units 311a, a reference signal sequence generating unit 314a, and reference signal multiplexing units 315a. The base station 30 further includes buffers for LTE mobile stations 303b, channel encoding units 307b, data modulation units 309b, precoding multiplying units 311b, a reference signal sequence generating unit 314b, and reference signal multiplexing units 315b. The base station 30 further includes IFFT (Inverse Fast Fourier Transform) units 317, CP (Cyclic Prefix) adding units 319, and RF (Radio Frequency) transmission circuits 321 for respective antennas.

While the base station 30 includes eight transmission antennas in the shown example, the base station 30 may include two or more antennas. In addition, the base station 30 is mere an example of a base station according to a precoding MIMO transmission scheme, in which the same data are replicated, multiplied with precoding weights for the respective transmission antennas, and transmitted from the plural transmission antennas. When precoding is not applied, the base station 30 may not include the precoding multiplying units 311a and 311b, for example.

Each of the buffers for LTE-A mobile stations 303a stores transmission data to be transmitted to each of N1 LTE-A mobile stations within the cell of the base station 30. Each of the buffers for LTE mobile stations 303b stores transmission data to be transmitted to each of N2 LTE mobile stations within the cell of the base station 30.

The scheduler 305 allocates resource blocks to the transmission data stored in the buffers 303a and 303b. The scheduler 305 performs scheduling for both LTE mobile stations and LTE-A mobile stations. The scheduler 305 supplies resource allocation information to the subcarrier mapping unit 313, the reference signal sequence generating units 314a and 314b, and the reference signal multiplexing units 315a and 315b.

The channel encoding units 307a through the precoding multiplying units 311a for LTE-A mobile stations perform the same operations as the channel encoding units 107a through the precoding multiplying units 111a shown in FIG. 5. In addition, the channel encoding units 307b through the precoding multiplying units 311b for LTE mobile stations perform the same operations as the channel encoding units 107b through the precoding multiplying units 111b shown in FIG. 5.

The subcarrier mapping unit 313 maps the transmission data to subcarriers based on the resource allocation information supplied from the scheduler 305.

The reference signal sequence generating unit 314a for LTE-A mobile stations generates a reference signal sequence for LTE-A mobile stations as shown in the left side of FIG. 9 or FIG. 10A, for example. Each of the reference signal multiplexing units 115a for LTE-A mobile stations multiplexes the reference signal sequence for LTE-A mobile stations into a resource block allocated to the LTE-A mobile station.

The reference signal sequence generating unit 314b for LTE mobile stations generates a reference signal sequence for LTE mobile stations as shown in the right side of FIG. 9 or FIG. 10A, for example. Each of the reference signal multiplexing units 315b for LTE mobile stations multiplexes the reference signal sequence for LTE mobile stations into a resource block allocated to the LTE mobile station. Information indicating that the reference signal sequence for LTE-A mobile stations are used (information indicating that antenna-orthogonal reference signals are used) is stored as L1/L2 control information.

Transmission signals into which the reference signals (and L1/L2 control information) are multiplexed undergo inverse fast Fourier transform in the IFFT units 317 to be converted into the time domain for the respective antennas. Then, the CP adding units 319 insert guard intervals (CPs) into the transmission signals, which are then transmitted from the RF transmission circuits 321 to each mobile station.

3.3 Mobile Station

Figure 12:
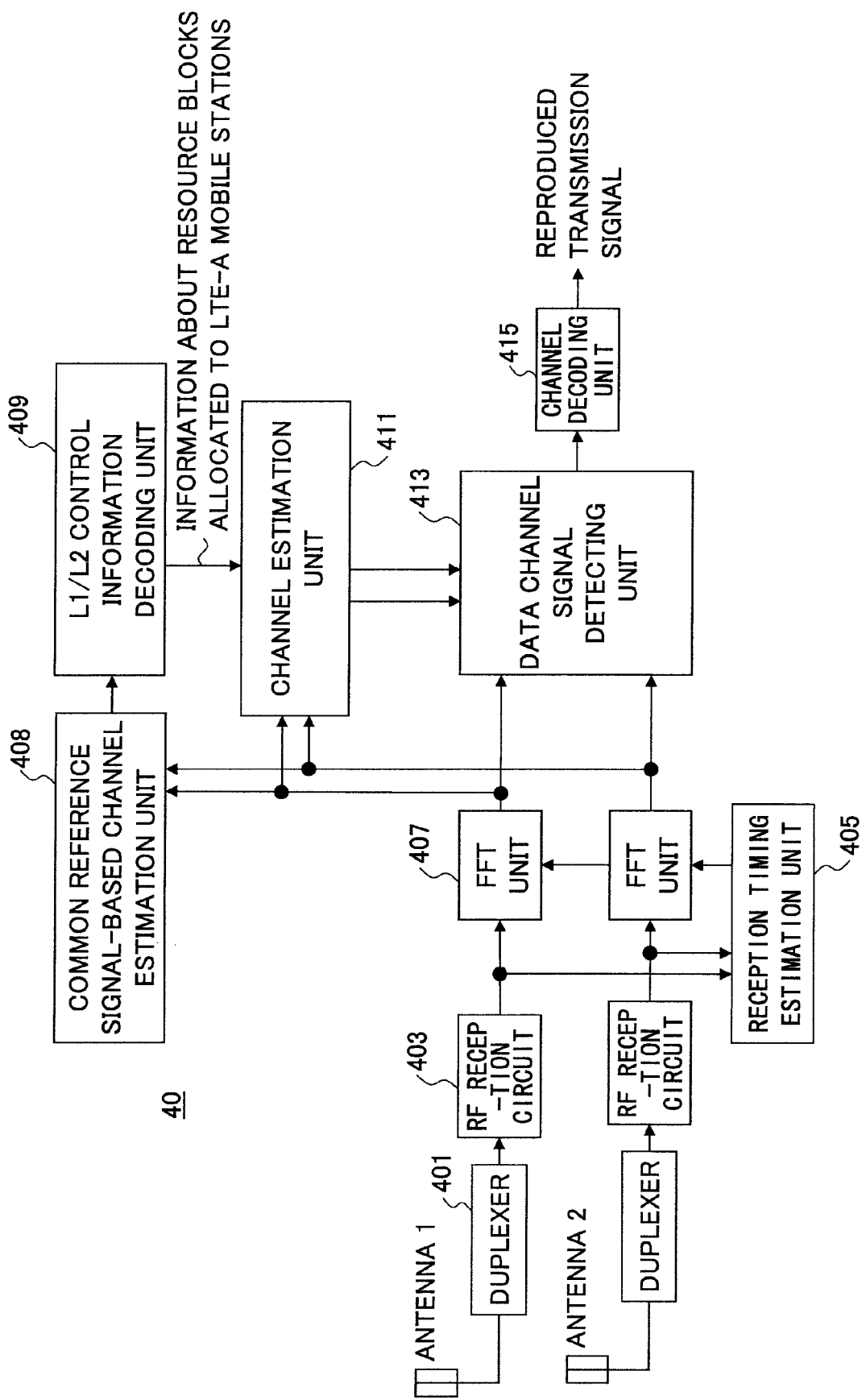
FIG. 12 shows a block diagram of a mobile station according to the second or third embodiment of the present invention.

With reference to FIG. 12, a configuration of a mobile station 40 is described below. The mobile station 40 is applicable to both the second embodiment and the third embodiment. The mobile station 40 corresponds to a mobile station such as an LTE-A mobile station for receiving reference signals adapted to downlink communications from N transmission antennas (for example, eight transmission antennas) in the base station. The mobile station 40 includes duplexers 401, RF reception circuits 403, a reception timing estimation unit 405, FFT (Fast Fourier Transform) units 407, a common reference signal-based channel estimation unit 408, an L1/L2 control information decoding unit 409, a channel estimation unit 411, a data channel signal detecting unit 413, and a channel decoding unit 415. While the mobile station 40 includes two antennas in the shown example, the mobile station 40 may include one antenna or more than two antennas.

The duplexers 401 through the FFT units 407 perform the same operations as the duplexers 201 through the FFT units 207 shown in FIG. 6.

The common reference signal-based channel estimation unit 408 performs channel estimation using portions common to both the reference signal sequence for LTE mobile stations as shown in the right side of FIG. 9 or FIG. 10A, for example, and the reference signal sequence for LTE-A mobile stations as shown in the left side of FIG. 9 or FIG. 10A, for example. The amount of phase rotation and/or the amount of amplitude variation in the propagation path are obtained in the channel estimation.

The L1/L2 control information decoding unit 409 decodes L1/L2 control information using the result of channel estimation based on the portions common to both of the reference signal sequences. The arrangement of the reference signal sequence suitable for LTE-A mobile stations is understood from this L1/L2 control information. For example, it is understood that the arrangement shown in the left side of FIG. 9 or FIG. 10A is used for the reference signal sequence.

The channel estimation unit 411 performs channel estimation using portions common to both the reference signal sequence for LTE mobile stations and the reference signal sequence for LTE-A mobile stations as well as using antenna-orthogonal dedicated reference signals for LTE-A mobile stations.

The data channel signal detecting unit 413 demodulates data using the result of channel estimation in the channel estimation unit 411. The channel decoding unit 415 decodes the data modulated by the data channel signal detecting unit 413 and reproduces the signals transmitted from the base station.

3.4 Exemplary Operation

Figure 13:
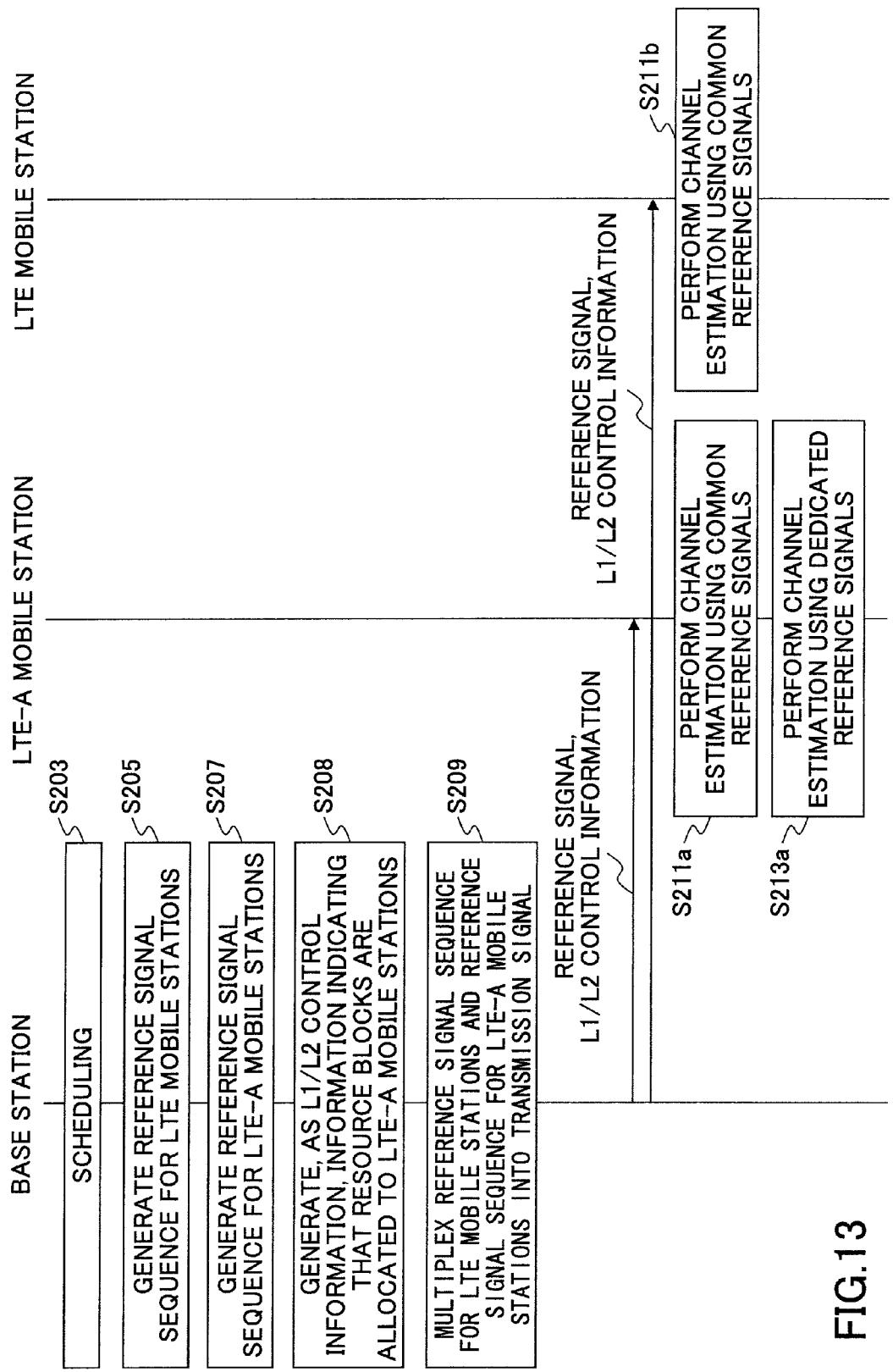
FIG. 13 shows a reference signal multiplexing and channel estimation method according to the second or third embodiment of the present invention.

With reference to FIG. 13, a reference signal multiplexing and channel estimation method according to the second or third embodiment of the present invention is described below.

The base station performs scheduling for LTE mobile stations and LTE-A mobile stations to allocate resource blocks to the respective mobile stations (S203). The base station generates a reference signal sequence for LTE mobile stations, as shown in the right side of FIG. 9 or FIG. 10A, for example (S205). The base station also generates a reference signal sequence for LTE-A mobile stations, as shown in the left side of FIG. 9 or FIG. 10A, for example (S207). The base station generates, as L1/L2 control information, information indicating that resource blocks are allocated to LTE-A mobile stations (S208). Then, the base station multiplexes the reference signal sequence for LTE mobile stations into the resource block allocated to the LTE mobile station and multiplexes the reference signal sequence for LTE-A mobile stations into the resource block allocated to the LTE-A mobile station (S209). In this step, the L1/L2 control information is also multiplexed into the resource blocks. Transmission signals into which the reference signals and the L1/L2 control information are multiplexed are transmitted to the LTE mobile station and the LTE-A mobile station.

The LTE-A mobile station performs channel estimation using portions common to both the reference signal sequences to decode the L1/L2 control information (S211a). Then, the LTE-A mobile station performs channel estimation using dedicated reference signals (S213a). The LTE mobile station performs channel estimation using portions common to both the reference signal sequences to decode the L1/L2 control information (S211b).

4. Fourth Embodiment

Figure 14:
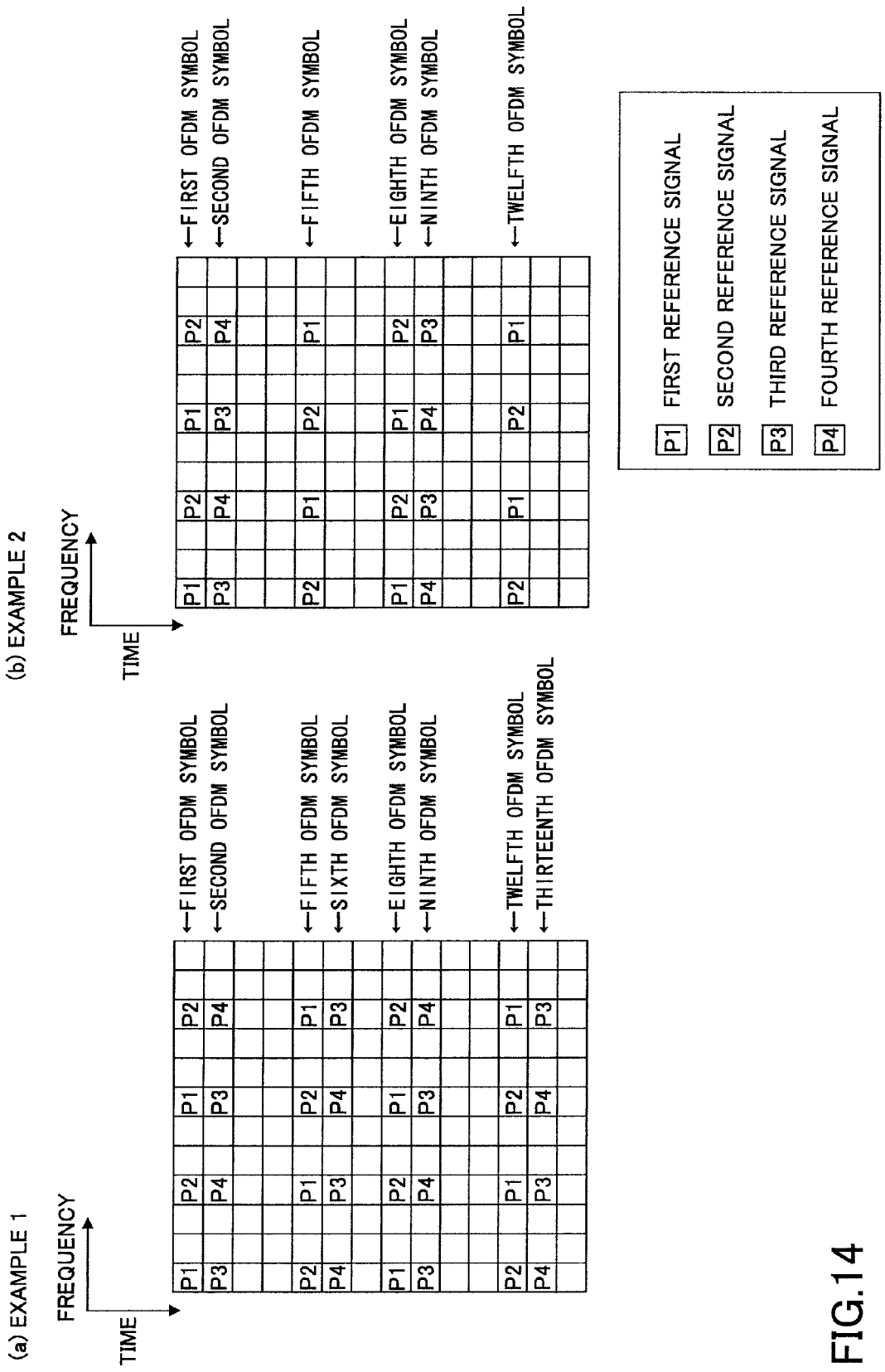
FIG. 14 shows an exemplary arrangement of four types of reference signals according to a fourth embodiment of the present invention.

While the LTE-A base station includes eight antennas in the above-mentioned embodiments, the number of antennas is not essential to the present invention. The LTE-A base station may use four transmission antennas in a similar manner to the LTE base station. The concept described in the above-mentioned embodiments can be also applied to the case of four transmission antennas, that is, different reference signal sequences may be used for LTE mobile stations and LTE-A mobile stations. FIG. 14 shows an exemplary arrangement of a reference signal sequence for LTE-A mobile stations in the case where the base station includes four antennas. In this case, the arrangement of the reference signal sequence suitable for LTE-A mobile stations is, preferably in part or in whole, in common with the arrangement of the reference signal sequence suitable for LTE mobile stations.

As shown in FIG. 14(a), a reference signal sequence for LTE-A mobile stations may be arranged so that the number of symbols in one of four types of reference signals is the same as the number of symbols in another of the four types of reference signals. Alternatively, as shown in FIG. 14(b), a reference signal sequence suitable for LTE-A mobile stations is arranged so as not to increase overhead of reference signals in the resource block allocated to the LTE-A mobile station.

The embodiments disclosed herein focus on the case where both LTE mobile stations and LTE-A mobile stations coexist. However, the present inventions are not limited to these specific embodiments, but are also applicable to the case where both mobile stations for receiving M types of reference signals and mobile stations for receiving N (N>M) types of reference signals coexist. It should be noted that N may be equal to any value more than or equal to two. In addition, the embodiments disclosed herein focus on the precoding MIMO transmission scheme, in which the same data are replicated, multiplied with precoding weights for the respective transmission antennas, and transmitted from the plural transmission antennas. However, the present inventions are not limited to the precoding MIMO transmission scheme, but are also applicable to the case where the base station includes plural transmission antennas.

According to the embodiments of the present invention, accuracy of channel estimation in the mobile station can be improved when plural transmission antennas are used in the base station. For example, a mobile station can perform channel estimation using reference signals from more than four transmission antennas, when the base station includes more than four transmission antennas.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. Separation of the embodiments or items are not essential to the present invention, and two or more disclosed embodiments or items may be combined as needed or a disclosed certain embodiment or item may be applied to another disclosed embodiment or item (if consistent). For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

An apparatus and a method according to the present invention may be illustratively described as follows.

(1) A base station for transmitting reference signals, comprising:

a first reference signal sequence generating unit configured to generate a first reference signal sequence in which M types of reference signals are arranged;

a second reference signal sequence generating unit configured to generate a second reference signal sequence in which N (N>M) types of reference signals are arranged;

a scheduler configured to allocate resource blocks to a first mobile station and a second mobile station;

a signal multiplexing unit configured to multiplex the first reference signal sequence into the resource block allocated to the first mobile station and multiplex the second reference signal sequence into the resource block allocated to the second mobile station; and a transmitting unit configured to transmit the first and second reference signal sequences.

(2) The base station as described in (1), wherein:

the first reference signal sequence generating unit generates the first reference signal sequence so that the number of symbols in one of the M types of reference signals has a predetermined relationship with the number of symbols in another of the M types of reference signals, and the second reference signal sequence generating unit generates the second reference signal sequence so that the number of symbols in one of the N types of reference signals has a predetermined relationship with the number of symbols in another of the N types of reference signals.

(3) The base station as described in (1), wherein:

the second reference signal sequence generating unit arranges the second reference signal sequence so that an arrangement of the second reference signal sequence is, at least in part, in common with an arrangement of the first reference signal sequence.

(4) The base station as described in (1), wherein:

the scheduler quasi-statically segments resource blocks to be allocated to the first mobile station and resource blocks to be allocated to the second mobile station in a frequency direction or a time direction.

(5) The base station as described in (4), further comprising:

a control information transmitting unit configured to transmit to mobile stations within a cell, as common control information, information about the resource blocks to be allocated to the first mobile station and the second mobile station.

(6) The base station as described in (1), further comprising:

an L1/L2 control information generating unit configured to generate information about an arrangement of the second reference signal sequence as L1/L2 control information in the resource block allocated to the second mobile station for each subframe; and an L1/L2 control information transmitting unit configured to transmit the L1/L2 control information.

(7) A mobile station for receiving reference signals from a base station, comprising:

a control information decoding unit configured to decode information about an arrangement of a reference signal sequence; and a first channel estimating unit configured to perform channel estimation based on the arrangement of the reference signal sequence.

(8) The mobile station as described in (7), further comprising:

a second channel estimating unit configured to perform channel estimation based on a portion common to both a first reference signal sequence in which M types of reference signals are arranged and a second reference signal sequence in which N (N>M) types of reference signals are arranged, wherein the control information decoding unit decodes L1/L2 control information based on the result of the channel estimation by the second channel estimating unit and decodes the information about the arrangement of the reference signal sequence from the L1/L2 control information.

(9) A reference signal multiplexing method in a base station for multiplexing reference signals, comprising the steps of:

generating a first reference signal sequence in which M types of reference signals are arranged;

generating a second reference signal sequence in which N (N>M) types of reference signals are arranged;

allocating resource blocks to a first mobile station and a second mobile station; and multiplexing the first reference signal sequence into the resource block allocated to the first mobile station and multiplex the second reference signal sequence into the resource block allocated to the second mobile station.

This international patent application is based on Japanese Priority Application No. 2008-126428 filed on May 13, 2008, the entire contents of which are incorporated herein by reference.

This international patent application is also based on Japanese Priority Application No. 2008-241677 filed on Sep. 19, 2008, the entire contents of which are incorporated herein by reference.

DESCRIPTION OF NOTATIONS 10 base station
101 frequency band control unit
103a, 103b buffer
105a, 105b scheduler
107a, 107b channel encoding unit
109a, 109b data modulation unit
111a, 111b precoding multiplying unit
113a, 113b subcarrier mapping unit
114a, 114b reference signal sequence generating unit
115a, 115b reference signal multiplexing unit
117 IFFT unit
119 CP adding unit
121 RF transmission circuit
20 mobile station
201 duplexer
203 RF reception circuit
205 reception timing estimation unit 207 FFT unit
209 broadcast information decoding unit
211 channel estimation unit
213 data channel signal detecting unit
215 channel decoding unit
30 base station
303a, 303b buffer
305 scheduler
307a, 307b channel encoding unit
309a, 309b data modulation unit
311a, 311b precoding multiplying unit
313 subcarrier mapping unit
314a, 314b reference signal sequence generating unit
315a, 315b reference signal multiplexing unit
317 IFFT unit
319 CP adding unit
321 RF transmission circuit
40 mobile station
401 duplexer
403 RF reception circuit
405 reception timing estimation unit
407 FFT unit
408 common reference signal-based channel estimation unit
409 L1/L2 control information decoding unit
411 channel estimation unit
413 data channel signal detecting unit
415 channel decoding unit

The invention claimed is:

1. A base station for communicating with a first user equipment terminal within a first system band and communicating with a second user equipment terminal within a second system band, comprising:
 a first reference signal sequence generating unit configured to generate a first to M-th reference signal sequences;
 a second reference signal sequence generating unit configured to generate a first to (2*M)-th reference signal sequences;
 a scheduling unit configured to allocate one or more resource blocks including a predetermined number of subcarriers over successive first and second time slots to each of the first user equipment terminal and the second user equipment terminal;
 a signal multiplexing unit configured to multiplex the first to M-th reference signal sequences into a first resource block to be allocated to the first user equipment terminal and multiplex the first to (2*M)-th reference signal sequences into a second resource block to be allocated to the second user equipment terminal; and
 a transmitting unit configured to transmit signals including the first resource block and the second resource block, wherein
 an arrangement in the first time slot within the first resource block of the first through M-th reference signal sequences defined by OFDM symbols and subcarriers is equal to an arrangement in the first time slot within the second resource block of the first to M-th reference signal sequences defined by OFDM symbols and subcarriers, and
 an arrangement in the second time slot within the first resource block of the first through M-th reference signal sequences defined by OFDM symbols and subcarriers is equal to an arrangement in the second time slot within the second resource block of the (M+1)-th to (2*M)-th reference signal sequences defined by OFDM symbols and subcarriers.

2. The base station as claimed in claim 1, wherein:
 the first reference signal sequence generating unit generates the first reference signal sequences so that the number of symbols in one of the first to M-th reference signal sequences has a predetermined relationship with the number of symbols in another of the first to M-th reference signal sequences, and
 the second reference signal sequence generating unit generates the second reference signal sequences so that the number of symbols in one of the first to (2*M)-th reference signal sequences has a predetermined relationship with the number of symbols in another of the first to (2*M)-th of reference signal sequences.

3. The base station as claimed in claim 1, wherein:
 radio resources available for allocation to the first user equipment terminal and radio resources dedicated to the second user equipment terminal are segmented in a frequency and/or time axis.

4. The base station as claimed in claim 3, wherein:
 plural boundaries between the radio resources available for allocation to the first user equipment terminal and the radio resources dedicated to the second user equipment terminal are formed in the frequency axis.

5. The base station as claimed in claim 3, wherein:
 plural boundaries between the radio resources available for allocation to the first user equipment terminal and the radio resources dedicated to the second user equipment terminal are formed in the time axis.

6. The base station as claimed in claim 3, wherein:
 plural boundaries between the radio resources available for allocation to the first user equipment terminal and the radio resources dedicated to the second user equipment terminal are formed in both the frequency axis and the time axis.

7. The base station as claimed in claim 1, wherein:
 the radio resources available for allocation to the first user equipment terminal are shared radio resources which are also available for allocation to the second user equipment terminal, a lower-layer control signal indicating that the shared radio resources are allocated to the second user equipment terminal is transmitted to the second user equipment terminal, and
 the first to (2*M)-th reference signal sequences are mapped into a resource block in the shared radio resources as indicated by the lower-layer control signal.

8. The base station as claimed in claim 3, further comprising:
 radio resource control unit configured to control how to segment the radio resources available for allocation to the first user equipment terminal and the radio resources dedicated to the second user equipment terminal and generate segmentation information as common control information to be transmitted to user equipment terminals within a cell.

9. The base station as claimed in claim 1, wherein:
 the first to (2*M)-th reference signal sequences are mapped into the resource block as indicated by a lower-layer control signal that indicates a resource block allocated to the second user equipment terminal for each subframe.

10. A user equipment terminal for receiving reference signals from a base station, comprising:
 a control information decoding unit configured to decode information about an arrangement of reference signal sequences from control information received from the base station;
 a first channel estimating unit configured to extract the reference signal sequences from a received signal based on the arrangement of the reference signal sequences to perform channel estimation based on the extracted reference signal sequences; and a second channel estimating unit configured to perform channel estimation using both a first reference signal sequences included in a resource block in which M types of reference signal sequences are arranged and a second reference signal sequences included in a resource block in which N (N>M) types of reference signal sequences are arranged, wherein the control information decoding unit decodes lower-layer control information based on the result of the channel estimation by the second channel estimating unit and decodes the information about the arrangement of the reference signal sequences from the lower-layer control information, an arrangement in the first time slot within the first resource block of the first through M-th reference signal sequences defined by OFDM symbols and subcarriers is equal to an arrangement in the first time slot within the second resource block of the first to M-th reference signal sequences defined by OFDM symbols and subcarriers, and an arrangement in the second time slot within the first resource block of the first through M-th reference signal sequences defined by OFDM symbols and subcarriers is equal to an arrangement in the second time slot within the second resource block of (M+1)-th to (2*M)-th reference signal sequences defined by OFDM symbols and subcarriers.

11. A method performed by a base station for communicating with a first user equipment terminal within a first system band and communicating with a second user equipment terminal within a second system band, comprising the steps of:

generating a first to M-th reference signal sequences and a first to (2*M)-th reference signal sequences;

allocating one or more resource blocks including a predetermined number of subcarriers over successive first and second time slots to each of the first user equipment terminal and the second user equipment terminal;

multiplexing the first to M-th reference signal sequences into a first resource block to be allocated to the first user equipment terminal and multiplexing the first to (2*M)-th reference signal sequences into a second resource block to be allocated to the second user equipment terminal; and transmitting signals including the first resource block and second resource block, wherein an arrangement in the first time slot within the first resource block of the first through M-th reference signal sequences defined by OFDM symbols and subcarriers is equal to an arrangement in the first time slot within the second resource block of the first to M-th reference signal sequences defined by OFDM symbols and subcarriers, and an arrangement in the second time slot within the first resource block of the first through M-th reference signal sequences defined by OFDM symbols and subcarriers is equal to an arrangement in the second time slot within the second resource block of (M+1)-th to (2*M)-th reference signal sequences defined by OFDM symbols and subcarriers.

* * * * *